US012758882B2

(12) United States Patent
In

(10) Patent No.: US 12,758,882 B2
(45) Date of Patent: Oct. 13, 2026

(54) ELECTRONIC DEVICE FOR SERVER LOAD BALANCING AND OPERATION METHOD THEREOF

(71) Applicant: Samsung Electronics Co., Ltd., Suwon-si (KR)

(72) Inventor: Jeongsik In, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 18/535,435

(22) Filed: Dec. 11, 2023

(65) Prior Publication Data

US 2024/0131437 A1 Apr. 25, 2024
US 2024/0226753 A9 Jul. 11, 2024

Related U.S. Application Data

(63) Continuation of application No. PCT/KR2023/016573, filed on Oct. 24, 2023.

(30) Foreign Application Priority Data

Oct. 24, 2022 (KR) ........................ 10-2022-0137736
Nov. 9, 2022 (KR) ........................ 10-2022-0148853

(51) Int. Cl.
*A63F 13/77* (2014.01)
*G06F 9/50* (2006.01)

(52) U.S. Cl.
CPC ............ *A63F 13/77* (2014.09); *G06F 9/5083* (2013.01)

(58) Field of Classification Search
CPC ...... A63F 13/77; A63F 13/352; A63F 13/358; A63F 13/822; A63F 13/35; G06F 9/5083; G06F 9/52; G06F 9/542; G06F 2209/5022
USPC ........................................................... 463/42
See application file for complete search history.

(56) References Cited

U.S. PATENT DOCUMENTS 7,574,499 B1 * 8/2009 Swildens .............. H04L 41/509 709/224
9,233,304 B2 1/2016 Kurabayashi et al.
11,336,579 B2 * 5/2022 Sawyer ................. H04L 45/028
(Continued)

FOREIGN PATENT DOCUMENTS

CN 108881344 B 6/2021
JP 2017-037445 2/2017
(Continued)

OTHER PUBLICATIONS

Search Report and Written Opinion dated Feb. 14, 2024 issued in International Patent Application No. PCT/KR2023/016573.

*Primary Examiner* — Michael A Cuff
(74) *Attorney, Agent, or Firm* — Nixon & Vanderhye P.C.

(57) ABSTRACT

An electronic device according to an embodiment includes: a scaling server configured to execute a first event occurring in a first region allocated a plurality of cells, at least one game server configured to execute a second event occurring in at least one second region adjacent to the first region, and at least one processor configured to process the scaling server and the at least one game server. The at least one processor configured to control at least one of the scaling server or the at least one game server so that at least one cell is transferred between the first region and the second region, based on a first load by the first event and a second load by the second event.

12 Claims, 20 Drawing Sheets

(56) References Cited

U.S. PATENT DOCUMENTS

| | | | | |
|---|---|---|---|---|
| 2002/0156891 | A1* | 10/2002 | Ulrich | G06F 16/10 709/225 |
| 2004/0116186 | A1 | 6/2004 | Shim et al. | |
| 2005/0054445 | A1* | 3/2005 | Gatto | G07F 17/32 463/40 |
| 2005/0246711 | A1* | 11/2005 | Berstis | H04W 4/029 718/105 |
| 2007/0117631 | A1 | 5/2007 | Lim et al. | |
| 2010/0113159 | A1 | 5/2010 | Chapman et al. | |
| 2013/0116044 | A1* | 5/2013 | Schwartz | A63F 13/12 463/29 |
| 2013/0253675 | A1 | 9/2013 | Kurabayashi et al. | |
| 2015/0231492 | A1 | 8/2015 | Shah | |
| 2015/0358401 | A1* | 12/2015 | Flavel | H04L 69/321 370/235 |
| 2017/0005520 | A1* | 1/2017 | Zeine | H02J 50/80 |
| 2018/0075650 | A1* | 3/2018 | Akenine-Moller | G06T 1/20 |
| 2018/0293084 | A1* | 10/2018 | Kadloor | G06F 13/4068 |
| 2018/0341728 | A1* | 11/2018 | Micou | G06F 9/5083 |
| 2019/0155515 | A1* | 5/2019 | Farey | G06F 3/0659 |
| 2019/0199790 | A1* | 6/2019 | Yang | H04L 67/1008 |
| 2019/0204894 | A1* | 7/2019 | Jahagirdar | G06F 1/3212 |
| 2022/0086102 | A1* | 3/2022 | Morgan | H04L 43/16 |
| 2023/0199062 | A1* | 6/2023 | Colenbrander | A63F 13/358 718/105 |

FOREIGN PATENT DOCUMENTS

| | | | |
|---|---|---|---|
| JP | 2017-037446 | | 2/2017 |
| KR | 10-2002-0025147 | | 4/2002 |
| KR | 10-2004-0052131 | | 6/2004 |
| KR | 20050079606 | A | 8/2005 |
| KR | 10-0597433 | | 7/2006 |
| KR | 100742357 | B1 | 7/2007 |
| KR | 10-2010-0051014 | | 5/2010 |
| KR | 10-2011-0067377 | | 6/2011 |
| KR | 20110067377 | A | 6/2011 |
| KR | 10-2011-0136079 | | 12/2011 |
| KR | 10-2013-0108188 | | 10/2013 |

* cited by examiner

| | | Takeover server | | | | | | | | |
|---|---|---|---|---|---|---|---|---|---|---|
| | | Higher | | | Equal | | | Lower | | |
| | | High load | Appropriate load | Low load | High load | Appropriate load | Low load | High load | Appropriate load | Low load |
| Handover server | High load | Transfer | Transfer | Transfer | | | Transfer | | | Transfer |
| | Appropriate load | | Conditional transfer | | | Conditional transfer | | | Conditional transfer | Transfer |
| | Low load | | | | | | | | | Transfer |

FIG. 13

ELECTRONIC DEVICE FOR SERVER LOAD BALANCING AND OPERATION METHOD THEREOF

CROSS-REFERENCE TO RELATED APPLICATIONS

This application is a continuation of International Application No. PCT/KR2023/016573 designating the United States, filed on Oct. 24, 2023, 2023, in the Korean Intellectual Property Receiving Office and claiming priority to Korean Patent Application Nos. 10-2022-0137736, filed on Oct. 24, 2022, and 10-2022-0148853, filed on Nov. 9, 2022, in the Korean Intellectual Property Office, the disclosures of each of which are incorporated by reference herein in their entireties.

BACKGROUND

Field

The disclosure relates to an electronic device for balancing and processing a load of a server and an operation method thereof.

Description of Related Art

Massively multiplayer online role-playing game (MMORPG) is one of the game genres that allow a plurality of users to simultaneously connect one online world through characters and interact in real time. Metaverse may refer to a field that implements, in a certain virtual world, activities generated in real world.

MMORPG and metaverse have the following in common. 1) a virtual world is defined, 2) a plurality of users connect the defined virtual world, and 3) the plurality of users each can perform independent activities to generate independent events or to generate events through interactions with each other. At this time, implementation of the virtual world and processing of the events can be implemented through a server.

The server receives commands from a plurality of user terminals, computes changes caused by the received commands to the virtual world, and reflects the resulting event to the user terminal. Interactions between the user terminal and the server can be relatively simple, but in MMORPG or metaverse, since countless users connect, interaction between different user terminals must be considered. These interactions are not limited to 1:1 relationship, but can be applied to more complex relationship as well. In this case, the server must process occurring events without contradiction, and the event processing result must be completed within a limited time. If not, the server cannot provide a service that meets a user's request.

If the server processes countless events without contradiction, an excessive load is generated accordingly. In order to address this problem, a server system can have a plurality of servers, and have each server be responsible for a different region in the virtual world, thereby balancing and processing a load for each server.

SUMMARY

Embodiments of the disclosure balance and process a load in a server environment in which user's connection is made on a large scale, such as MMORPG or metaverse.

Embodiments of the disclosure efficiently process load balancing through cell transfer between servers.

Embodiments of the disclosure minimize and/or reduce a synchronization load generated in a plurality of servers, by limiting event synchronization between servers.

An electronic device according to an example embodiment includes: a scaling server configured to execute a first event occurring in a first region allocated a plurality of cells, at least one game server configured to execute a second event occurring in at least one second region adjacent to the first region, and at least one processor configured to control the scaling server and the at least one game server. The at least one processor is configured to control at least one of the scaling server or the at least one game server so that at least one cell is transferred between the first region and the second region, based on a first load by the first event and a second load by the second event.

An electronic device according to an example embodiment includes: a first game server configured to: receive a first command for a first event from a first user terminal, and execute the first event occurring in a first region, a second game server configured to: receive a second command for a second event from a second user terminal, and execute the second event occurring in a second region, and at least one processor configured to control the first game server and the second game server. The at least one processor is configured to: control the first game server so that the first event is executed or canceled based on the first command arriving at a first time from a time point when the first command is generated, and control the first game server to deliver the first event to the second game server, after the first game server receives the first command from the first user terminal, and control the first game server and the second game server so that the first event is executed based on the first game server not receiving a message for the second event from the second game server within a specified time from a time point based on the first game server delivering the first event.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13 is a diagram illustrating an example operation of cell transfer dependent on conditions between game servers according to various embodiments;

DETAILED DESCRIPTION

Figure 1:
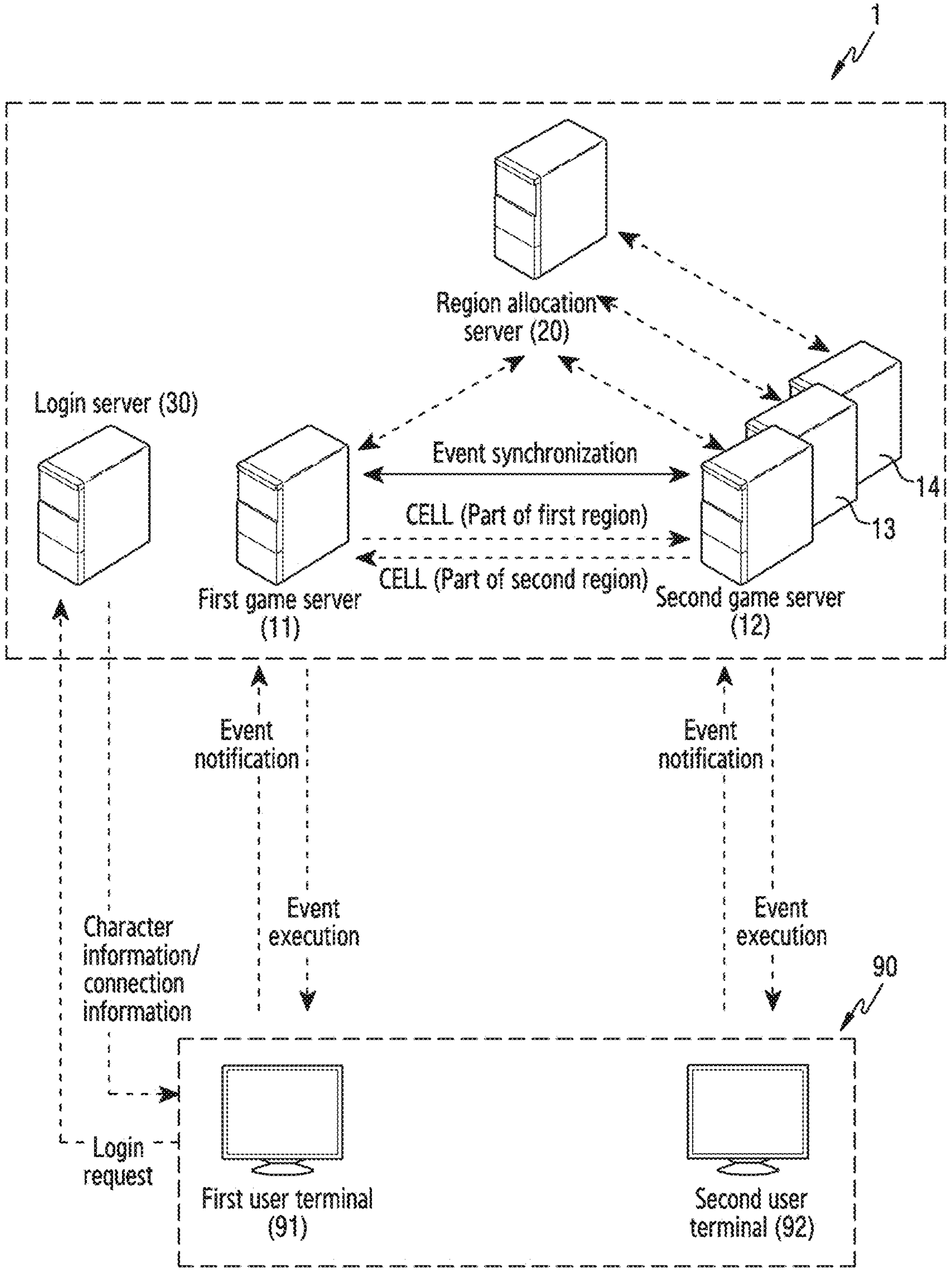
FIG. 1 is a diagram illustrating an example network configuration between an electronic device and a user terminal according to various embodiments.

Hereinafter, various example embodiments of the present disclosure will be described in greater detail with reference to the accompanying drawings. An advantage and feature of various example embodiments of the disclosure, and a method of achieving them, will become clear with reference to a detailed description of the following embodiments taken in conjunction with the accompanying drawings. However, the present disclosure is not limited to the example embodiments disclosed below, but may be implemented in various different forms, and the present example embodiments are presented as illustrative examples. The same reference numerals indicate the same components throughout the disclosure.

Unless otherwise defined, terms (including technical and scientific terms) used in the present disclosure may be used as a meaning commonly understood by a person having ordinary skill in the art to which the present disclosure pertains. Also, terms defined in commonly used dictionaries are not to be interpreted ideally or excessively unless explicitly specifically defined. Terms used in the present disclosure are used to describe the example embodiments and are not intended to limit the present disclosure. In the present disclosure, singular forms also include plural forms unless specifically stated otherwise in a phrase.

"Comprises" and/or "comprising" used in the disclosure may refer, for example, to a stated component, step, operation, and/or element not excluding the presence or addition of one or more other components, steps, operations, and/or elements.

Prior to the description of the present disclosure, various terms used in the present disclosure will be described.

A server (a game server 10, a region allocation server 20, a login server 30, etc.) of the present disclosure may not only refer to a generally used server hardware, but may also correspond to a concept including a software unit capable of dividing and processing a client and/or a service responsible region, etc. within one server hardware. Accordingly, although the present disclosure describes that embodiments are implemented by a plurality of servers, they may be implemented by one physical device.

A user terminal of the present disclosure may be a notebook, a desktop, a laptop, a smart phone, etc., but is not limited thereto, and may include all types of devices having a computing function and a communication function.

The server may present a service to the user terminal through a network. The service presented by the server is typically an MMORPG-style online game, but it may also be applied to a metaverse platform. Accordingly, in the present disclosure, a service may include not only online games, but also all online services in which a plurality of users connect to and engage in a specific virtual world. The user terminal may receive information of the virtual world from the server and output the information on a display or output a sound, etc. presented by the virtual world. The network may be implemented in all types of wired/wireless networks such as a local area network (LAN), a wide area network (WAN), a mobile radio communication network, and Wireless Broadband Internet (Wibro).

The server may define a virtual world. A user may receive a character from the server in the defined virtual world, and use a user terminal to control the character and compete or cooperate with other users. Information about the virtual world may be divided into static information and dynamic information. Taking a game as a representative example, the static information refers to information that does not change during the course of a game, such as fixed terrain features, and the dynamic information includes a position, state, or motion, etc. of the character that may change according to a command presented by the user terminal.

Static information may be previously implemented in the server at a service production or update stage, but the dynamic information may be processed according to the command presented by the user terminal through the server in real time whenever a change occurs by a user. The server may present the processed result to a client and reflect it to the user terminal. For example, when the character moves from region A to region B, the server processes a coordinate change dependent on the movement, and allows the user terminal to output a character's position change dependent on the movement. For another example, when character A attacks character B and causes damage to a physical strength of character B, the server allows the user terminal to output a change of the physical strength of character B. Any change within this virtual world may be defined as an event.

Events may occur according to user inputs, but may also occur automatically according to scenarios or algorithms implemented in the server. Since innumerable users connect to one virtual world, innumerable events of various types may occur non-simultaneously or simultaneously. Different events may affect each other, and the event processing results vary according to the order in which the events occur, so the server must process the events fairly and without contradiction. However, there is a fixed limit to the performance of the server, and there is a limit to the number of users managed by one server.

Therefore, in implementing the virtual world, the present disclosure defines a plurality of regions including a plurality of cells in the entire map which may be divided into cells being the minimum units, and one server is responsible for one region and process events occurring in a corresponding region. Hereinafter, a construction of an electronic device of an embodiment and an operation of each construction will be described with reference to FIG. 1, based, for example, on the above description.

Figure 2:
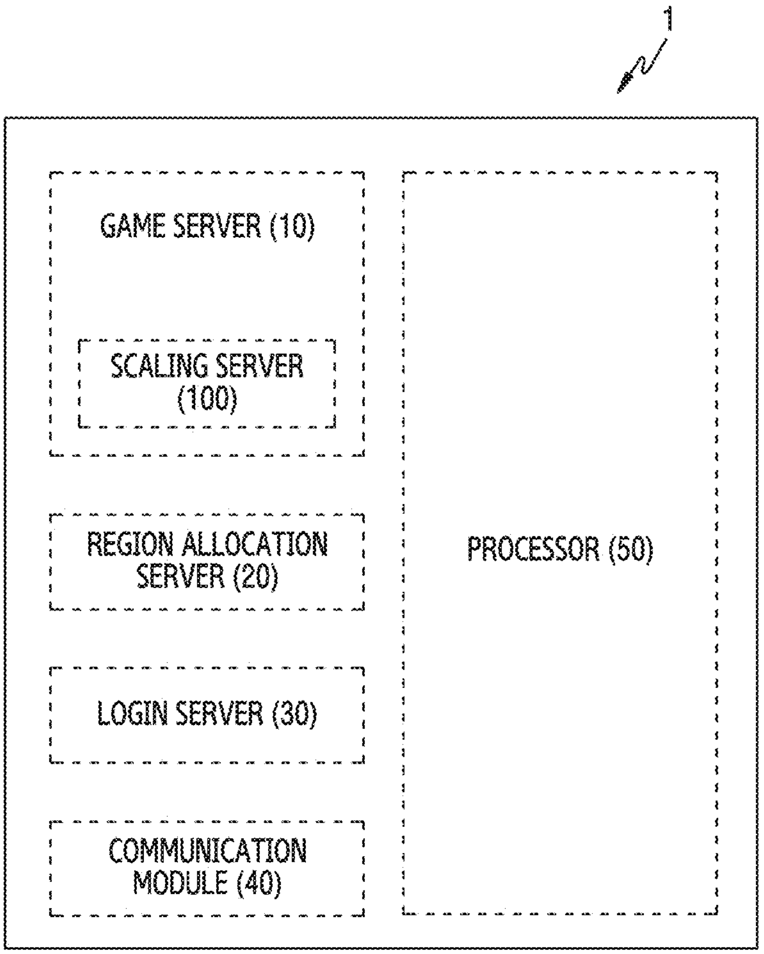
FIG. 2 is a block diagram illustrating an example configuration of an electronic device according to various embodiments.

FIG. 1 is a diagram illustrating an example network configuration between an electronic device and a user terminal according to various embodiments, and FIG. 2 is a block diagram illustrating an example configuration of an electronic device according to various embodiments.

Referring to FIG. 1 and FIG. 2, the electronic device 1 of an embodiment includes at least one game server 10: 11, 12, 13, 14 etc., a region allocation server 20, and a login server 30.

The game server 10 may receive an event-related command presented from the user terminal 90 and processes an event. The game server 10 provides an event according to a predetermined (e.g., specified) scenario or algorithm, processes it, and presents the processing result to the user terminal 90. Also, when events occurring in different regions are events capable of affecting each other, the game server 10 may perform event synchronization. For example, when an event occurring in a responsible first region of the first game server 11 is an event capable of affecting a responsible second region of the second game server 12, the occurring event may be presented from the first game server 11 to the second game server 12.

The game server 11 of an embodiment may transfer at least one cell to another game server 12 that is responsible for an adjacent region. A cell is the minimum unit that divides a region in order to process an event in a responsible region of a server. When there are a relatively large number of cells in a specific region, a server responsible for the specific region provides or may provide a lot of loads. Accordingly, the game server 10 may transfer at least one cell, a part of its responsible region, to another server according to a predetermined condition. Various example embodiments related to the foregoing will be described in greater detail below.

The region allocation server 20 manages information about which region the game server 10 is responsible for. For example, when the first game server 11 is responsible for region A, the region allocation server 20 may store information about region A and coordinate information about a plurality of cells of region A with respect to the first game server 11.

The region allocation server 20 of an embodiment may update changed information when a responsible region of the first game server 11 is changed. For example, when the first game server 11 transfers a cell to another game server or receives a cell from another game server and a responsible region is changed, the region allocation server 20 may update information about the changed responsible region.

The region allocation server 20 of an embodiment may manage coordinate information of a plurality of cells included in each of a plurality of regions. When at least one cell is transferred between the plurality of regions under the control of a processor 50, the region allocation server 20 may update coordinate information corresponding to the plurality of regions.

When a user logs in, the game server 10 may request region information to the region allocation server 20 to determine which game server to connect according to a starting position of a character.

The login server 30 may receive authentication information from a user terminal 90 and perform user login. The login server 30 may receive user authentication information stored in a user database through a cache server (not shown) and check whether or not it matches the authentication information received from the user terminal 90 and perform user login. When receiving a login request from the user terminal 90, the login server 30 may present character information and connection information to the user terminal 90.

A communication module (e.g., including various communication circuitry) 40 may receive input information and/or an execution command, etc. from the user terminal 90, and present them to the login server 30 and/or the game server 10. The communication module 40 may present various information and/or processing results stored in the game server 10 and/or the login server 30, to the user terminal 90. For example, the communication module 40 may include a transceiver for transmitting and receiving information.

The processor 50 may include various processing circuitry and controls the overall operation of each component of the electronic device 1. The processor 50 may include a central processing unit (CPU), a micro processor unit (MPU), a micro controller unit (MCU), a graphic processing unit (GPU), or any type of processor well known in the art of the present disclosure. Also, the processor 50 may perform an operation for at least one application or program for executing an operation method of embodiments of the present disclosure. The processor 50 of an embodiment may process an event occurring in the game server 10, and process data so that the event is executed. The processor 50 of an embodiment may control the game server 10 so that event synchronization between the game servers 10 is performed. The processor 50 of an embodiment may control the game server 10 and the region allocation server 20 so that cell transfer is performed between the game servers 10. The electronic device 1 may include at least one processor.

The user terminal 90 is connected to the electronic device 1 through a network, and receives a game service presented by the electronic device 1. The user terminal 90 may receive a service by exchanging a request signal and a response signal with the electronic device 1 through the network using a game application installed in the user terminal 90. The user terminal 90 may be referred to as a client, and the game service presented by the electronic device 1 may be a service for an online game and, in particular, when presenting a service for massively multiplayer online role-playing game (MMORPG), the electronic device 1 exchanges signals with a plurality of user terminals 90, respectively.

The user terminal 90 may be a notebook, a desktop, a laptop, a smart phone, etc., but is not limited thereto, and may include all types of devices equipped with computing functions and communication functions.

Referring to FIG. 2, a scaling server 100 may correspond to the game server 10 which is responsible for the highest region among a plurality of regions. Any one of the game servers 10 may be specified as the scaling server 100.

Figure 3:
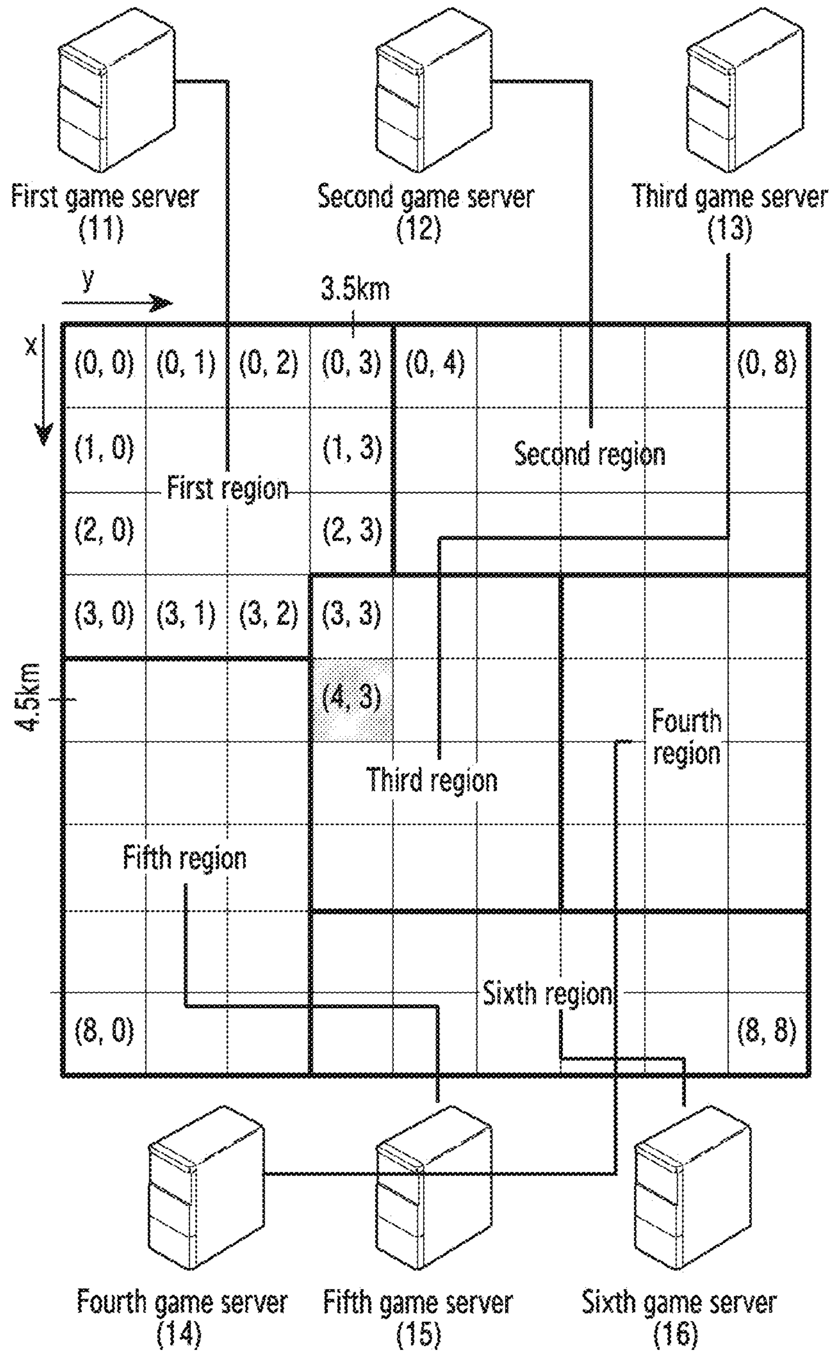
FIG. 3 is a diagram illustrating a responsible region for each game server according to various embodiments.

FIG. 3 is a diagram illustrating an example of a responsible region for each game server according to various embodiments.

The virtual world presented by the electronic device 1 is a virtual space in which a plurality of characters controlled by the user terminal 90 interact with each other within the entire map. Referring to FIG. 3, the entire map is divided into a plurality of regions, and each of a plurality of game servers 11, 12, 13, 14, 15, and 16 may be responsible for each region among the plurality of regions.

Referring to FIG. 3, for example, the entire map may be divided into first to sixth regions, and the first game server 11 is responsible for the first region, and the second game server 12 is responsible for the second region, and the third game server 13 is responsible for the third region, and the fourth game server 14 is responsible for the fourth region, and the fifth game server 15 is responsible for the fifth region, and the sixth game server 16 is responsible for the sixth region. Each game server 10 processes an event occurring within its responsible region. Each region includes a plurality of cells. For example, the first region may include 15 cells and include a cell having coordinate information (0, 0). The first game server 11 may process an event occurring in the cell having the coordinate information (0, 0) within the first region.

As described above, in the present disclosure, a virtual world map may be divided by the region unit in a regular form, and a region may be divided into cells, and one cell may be determined as the minimum unit for load balancing. Although the shape of the cell is shown as a square in FIG. 3, the shape of the cell may also be implemented as a polygon such as a triangle, a rectangle, or a hexagon according to the type of the virtual world. For example, when the virtual world map is implemented as a sphere, the shape of the cell may be defined as a hexagon, and coordinate information may be defined as longitude and latitude. In the present disclosure, for convenience of description, an embodiment is described on the premise that the shape of the cell is the square.

When starting a service of the present disclosure, an operator may manually set the number of game servers 10 and a responsible region of each game server 10 and input them to the region allocation server 20 (FIG. 1).

Each cell has a unique ID, which is coordinate information, and the game server 10 may connect to the region allocation server 20 at starting, and receive information about whether cells adjacent to its responsible region belong to the game server, together with a cell ID list of its responsible region.

An ID of each cell is given in a form in which it may be determined from a corresponding coordinate when coordinate information in a space of a virtual world is given. Since the size and shape of each cell is fixed, when a coordinate in the space of the virtual world is determined, the electronic device 1 may know an ID of a cell to which the corresponding coordinate belong, and accordingly may know a game server responsible for the corresponding coordinate.

For example, when a length of one side of each cell is 1 km, an ID of a cell to which a spatial coordinate (4.5 km, 3.5 km) belongs is (4, 3), and the game server 10 responsible for the corresponding coordinate is the third game server 13.

In the virtual world presented by the electronic device 1, a character may continuously move in space or may instantaneously move to an arbitrary place. For example, when the character continuously moves from the first game server 11 to the second game server 12 which is an adjacent server, the user terminal 90 obtains information of the second game server 12 responsible for a newly entered region from the first game server 11 responsible for a region where the character is originally located, and connects to the second game server 12.

This is possible because each game server 10 knows responsible game servers of all cells adjacent to a responsible region. When a character instantly moves to an arbitrary place, the user terminal 90 may obtain information about a responsible game server of a region to be newly entered from the region allocation server 20, and connect to the game server.

On the other hand, events occurring in different regions are processed in different game servers, but must be processed in a consistent manner in that they are implemented in one virtual world. Therefore, when one event affects different regions, event synchronization must be performed between the game servers. For example, when an event occurring by a character of a first user terminal 91 (FIG. 1) located in a first region also affects a second user terminal 92 (FIG. 2) located in a second region, after event synchronization between the first game server 11 and the second game server 12 is performed, the first game server 11 must transmit the event processing result to the first user terminal 91, and the second game server 12 must transmit the event processing result to the second user terminal 92.

To do this, it is advantageous to keep an actual transmission delay between the game servers low, and a load of each game server, in particular, a synchronization load between the game servers must be reduced in order to lower the actual transmission delay between the servers.

When the number of game servers 10 is increased, a load per game server 10 may be lowered whereas a cost of establishing a new game server and a synchronization load between the game servers may increase, so it is efficient to properly maintain the number of game servers 10, and keep a load of each game server 10 constant.

Therefore, in the present disclosure, by exchanging cells between the game servers 10, the entire load of the electronic device 1 may be maintained proportionately. Whenever the game server 10 responsible for a cell is changed, the change details may be updated to an adjacent game server and/or the region allocation server 20. Through this, each game server 10 may real-time maintain information of other game servers for all cells adjacent to its region.

As described above, the electronic device 1 may reduce the overall load of the electronic device 1 through cell transfer. That the overall load may be reduced through the cell transfer between the game servers 10 while the number of cells is maintained is because a cell load includes a synchronization load in addition to an internal load. The synchronization load will be described in greater detail below with reference to FIG. 4.

Figure 4:
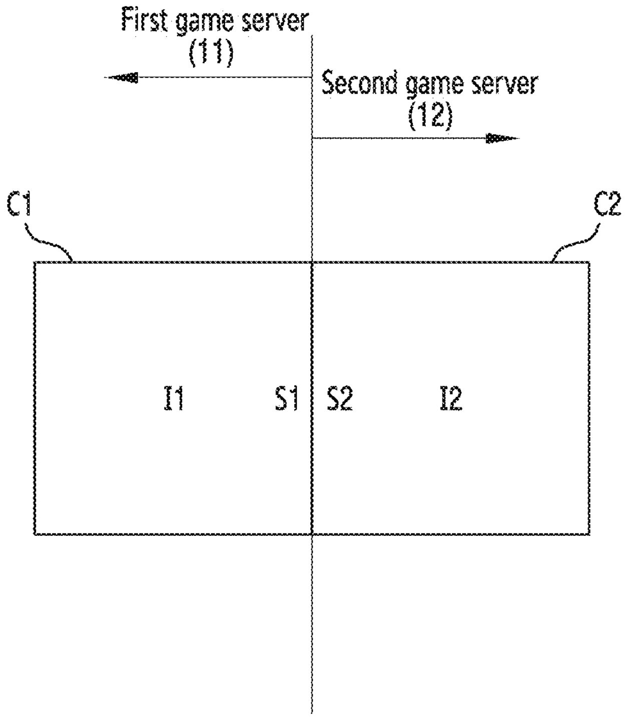
FIG. 4 is a diagram illustrating cells in different regions and an internal load and a synchronization load within the cell according to various embodiments.

FIG. 4 is a diagram illustrating cells in different regions and an internal load and a synchronization load within the cell according to various embodiments.

A load in one cell may be divided into an internal load and a synchronization load. The internal load is a load for processing an event occurring in its cell (or region), and the synchronization load is a load for propagating an event occurring in its cell (or region) to the adjacent game server 10, or processing an occurring event propagated from the adjacent game server 10.

Referring to FIG. 4, there are an internal load (I1) and a synchronization load (S1) in a first cell (C1) which is a part of a responsible region of a first game server 11, and there are an internal load (I2) and a synchronization load (S2) in a second cell (C2) which is a part of a responsible region of a second game server 12.

Generalizing this by the unit of the game server 10, it may be defined as follows.

Server internal load: I(G)=I(R)={Sum of I(c) for all cells (c) forming a region (R)}

Server synchronization load: S(G)=S(R)={Sum of loads processed by G among synchronization loads occurring a all boundaries of a region (R)}

Total server load: L(G)=L(R)=I(R)+S(R)

Load balancing is performed in a direction for appropriately maintaining an internal load within each game server 10, and maintaining a synchronization load between the game servers 10 at a low level.

The game server 10 periodically determines an internal load and a synchronization load for each cell within a responsible region, and the electronic device 1 periodically determines an internal load and synchronization load of the entire game server 10.

Most loads are loads for processing an event occurring from a character, and the electronic device 1 may estimate how much load will occur depending on the type and distribution of characters inside a cell and characters around the cell. That is, the overall load of the server may additionally consider a load that will be provided after a predetermined time in addition to a load that has been already provided. The electronic device 1 of an embodiment may predict a load to be provided in a corresponding cell from character distribution inside the cell and around the cell through machine learning. In addition, the electronic device 1 may predict the overall load to be provided in the future, based on a solution approximation function or table, etc. through statistics on loads provided in the past.

According to an embodiment, the processor 50 may calculate a load provided in each of a plurality of regions. The load may include an internal load for processing an event occurring in one region and a synchronization load for synchronizing the event occurring in one region (or the first game server 11) to another region (or the second game server 12). At this time, the load calculated by the processor 50 may be a load that has already occurred and/or a load that will occur later.

As described above, the electronic device 1 may minimize and/or reduce a synchronization load by exchanging cells between adjacent regions (or game servers). The plurality of regions may not be divided equally, but may be divided according to upper and lower relationships. A series of rules are required to distribute the overall load proportionately. In the present disclosure, efficient cell transfer may be performed by defining a hierarchical relationship between the scaling server 100, which is the highest server, and the game server 10. This will be described in greater detail below with reference to FIG. 5.

Figure 5:
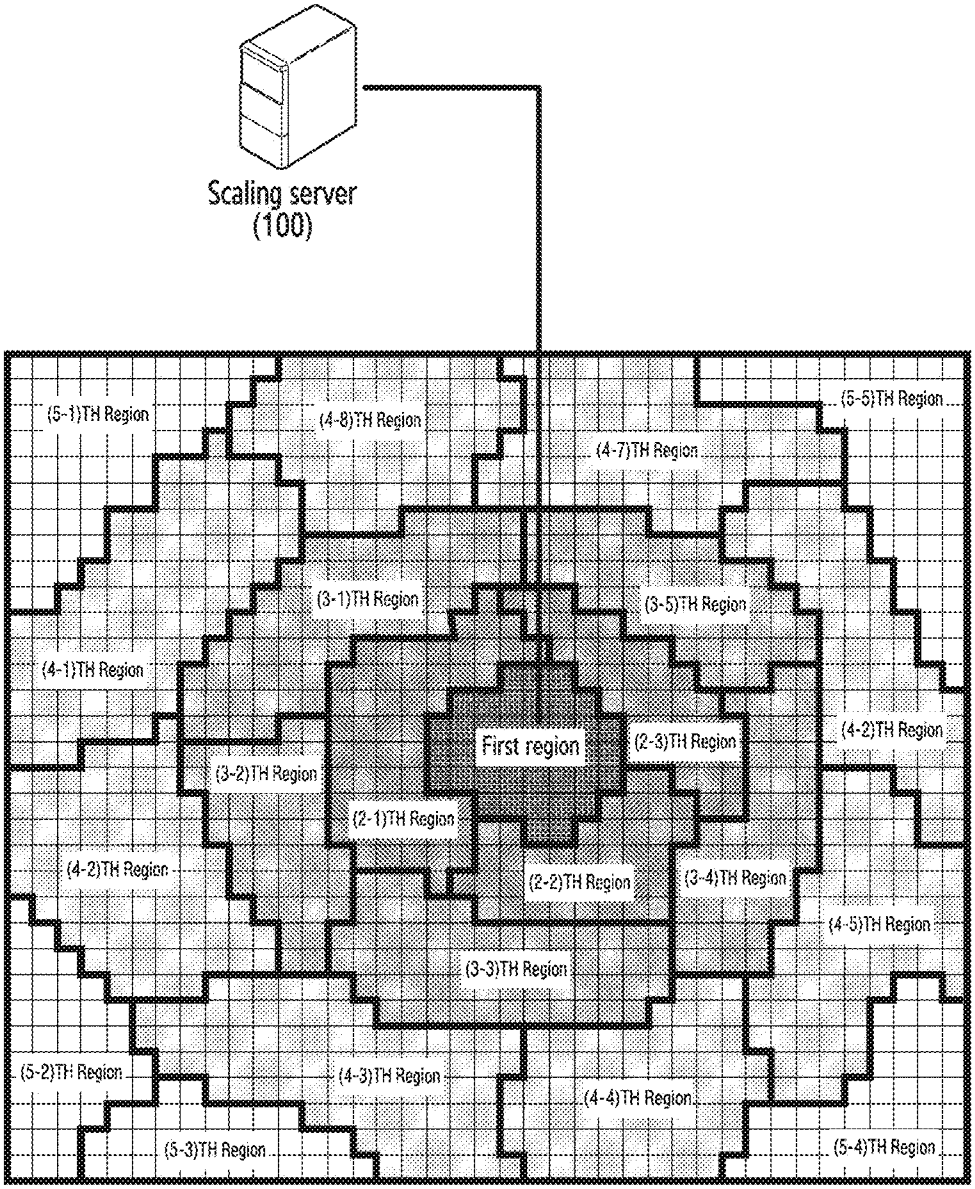
FIG. 5 is a diagram illustrating a responsible region of a scaling server according to various embodiments.

FIG. 5 is a diagram illustrating an example responsible region of a scaling server according to various embodiments.

All of a plurality of regions shown in FIG. 5 indicate the entire map of the virtual world. The plurality of regions may be divided into first to fifth regions, and the highest server may be responsible for the first region, and the lowest server may be responsible for the fifth region. As already described, each region may be divided into a plurality of cells. In FIG. 5, grids distinguished with thin lines represent cells, and partitions distinguished with thick lines represent responsible regions of each game server 10.

The plurality of cells may be a set of adjacent cells that are the minimum division units of the entire map which the scaling server 100 and at least one game server 10 are both responsible for. The entire map may be divided into the plurality of regions by the plurality of cells. The plurality of regions may include a first region and at least one second region adjacent to the first region. Also, the plurality of regions may further include an nth region in addition to the first region and the second region.

The scaling server 100 corresponds to the highest server responsible for the first region, which is the highest region. The scaling server 100 is not determined separately from the game server 10, and one specified game server among the game servers 10 is indicated as the scaling server 100.

In principle, the direction of cell transfer is from a lower region (upper game server) to an upper region (lower game server). In principle, the cell transfer may be performed between adjacent regions and minimize and/or reduce a length of a boundary between the adjacent regions. Accordingly, a synchronization load may be minimized and/or reduced.

According to an embodiment, when a load within a region is in a high load condition exceeding a specific threshold, one game server 10 transfers at least one cell within its responsible region, to a game server 10 responsible for a region close to a responsible region of the scaling server 100. That is, the cell transfer is performed from the lower region to the upper region.

According to the above-described embodiment, when the game server having received the cell is also in a high load state, the game server may also transfer some of its cells to a region close to a responsible region of the scaling server 100. When the overall load of the game server 10 increases, the above-described process is repeated and thus, the responsible cell of the game server having experienced a load increase is decreased while the responsible cell of the scaling server 100 may be increased.

The electronic device 1 may grant each game server 10 a region level which is an indicator of how far away it is from the scaling server 100, in order to establish a hierarchical relationship between the game servers 10. Referring to FIG. 5, the scaling server 100, which is the highest server, may have a first region level, and a game server responsible for a region adjacent to a region of the scaling server 100 may have a second region level. Regions other than the region of the scaling server 100 may have equal region levels and be divided into a plurality of regions.

Based on a specific game server, a game server having a lower region level value than the specific game server may be an upper game server, and a game server having a higher region level value than the specific game server may be a lower game server.

When cell transfer occurs, the region allocation server 20 of an embodiment may update a region (or game server) which a transferred cell belongs to and a region level dependent on the cell transfer. The game server may find out its region level and a region level of a game server adjacent to self, from the region allocation server 20.

As described above, the scaling server 100 is the highest server responsible for the first region, which is the highest region. In principle, a cell has a directionality of transferring from a lower region to an upper region, or transferring between equal regions. For the cell to transfer from the upper region to the lower region, the game server 10 responsible for the lower region must be in a low load state. That is, the cell has the directionality in principle, but may be transferred in an opposite direction when a load of a specific game server falls below an appropriate range.

When the overall load of the game server 10 increases, cell transfer occurs continuously based on the directionality of the cell, and when the load of the scaling server 100 exceeds a threshold according as the responsible cell of the scaling server 100 increases, a new variable server may be newly established. At this time, the scaling server 100 may transfer at least one cell to the newly established variable server.

When the overall load of the game server 10 decreases, a specific game server in a low load state may receive a cell from a game server close to the scaling server 100. When this process is repeated, the existing scaling server loses its status, and a new scaling server may be specified.

In this way, load control may be efficiently performed by specifying the scaling server 100 and transferring a cell through the scaling server 100. The example below may be referenced.

In an example, it is assumed that there are 10 game servers, and the number of responsible cells of each game server is 100, and a load for each cell is the same. It is assumed that a threshold of an appropriate load each game server may process is set to 99, and cell transfer occurs when a load of each game server exceeds 99. When loads of all game servers increase to 100, the game servers (9 game servers) excluding the scaling server may transfer 2 cells to the scaling server and reduce the number of its responsible cells to 98. The scaling server has a total of 118 cells when receiving 18 cells from 9 game servers. When a variable server is newly established, the scaling server transfers some of 118 cells to the variable server and has the remaining cells. When the scaling server transfers half of the cells, the following determination result may be derived as a whole.

Load of each game server before cell transfer occurs: 100 (exceeding a threshold)

Load of each game server after cell transfer occurs: 98 (less than a threshold)

Load of scaling server after cell transfer occurs: 118/2=59 (less than a threshold)

Load of variable server after cell transfer occurs: 118/2=59 (less than a threshold)

As a result, the number of servers has gone from 10 to 11, but all servers may have a load less than 99 (threshold). When the scaling server is not specified and the directionality is not defined, each server may increase from 10 to 20 in number by newly establishing a variable server separately. Since a separate load is provided even in a process of establishing the variable server, it may become inefficient in an overall point of view. That is, the load balancing of the present disclosure may be efficiently processed by defining the directionality and specifying the scaling server. This method may be applied even when the load decreases.

According to an embodiment, the electronic device 1 may further include a variable server automatically created to receive at least one cell from the scaling server 100. The processor 50 may create the variable server when the size of a first load of the first game server 11 and the size of a second load of the second game server 12 exceed a threshold. At this time, either the first game server 11 or the second game server 12 may be the scaling server 100. When the first game server 110 is the scaling server 100, the scaling server 100 may receive some of a plurality of cells located in a second region the second game server 12 is responsible for, and the scaling server 100 having received some of the plurality of cells may transfer some of the plurality of cells possessed to the variable server.

Figure 6:
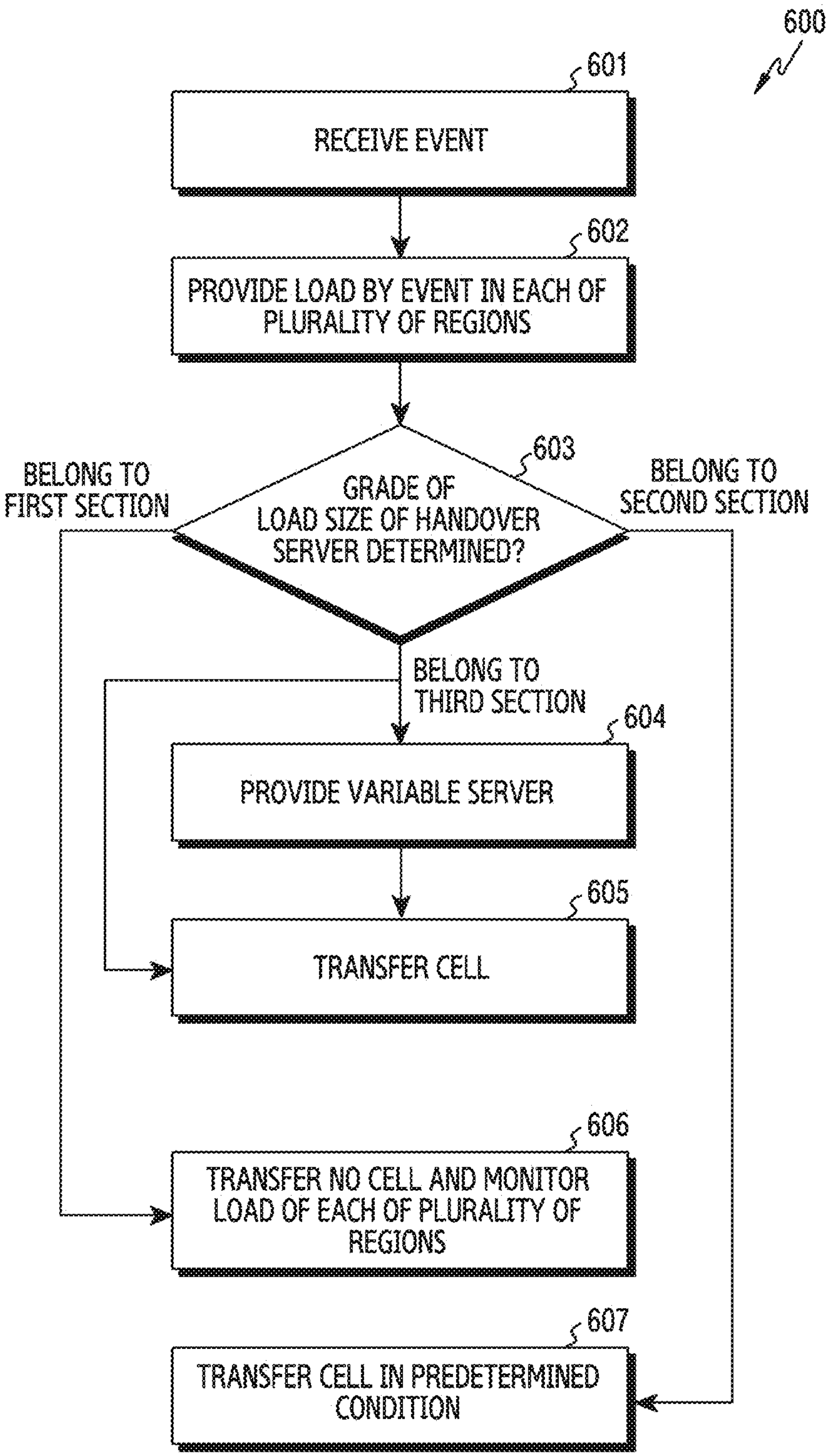
FIG. 6 is a flowchart illustrating an example method of operating an electronic device according to various embodiments.
Figure 7:
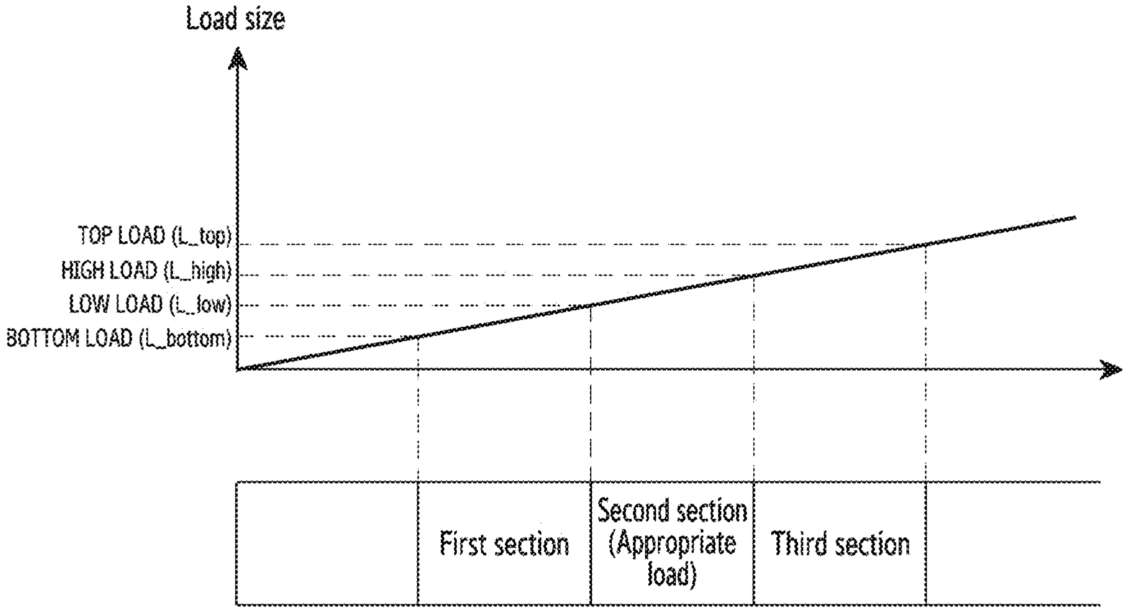
FIG. 7 is a diagram illustrating a grade section divided according to a load size according to various embodiments.

FIG. 6 is a flowchart illustrating an example method of operating an electronic device according to various embodiments, and FIG. 7 is a diagram illustrating an example grade section divided according to a load size according to various embodiments.

When the electronic device 1 receives an event from the user terminal 90 (601), an event occurs in each of a plurality of regions, and a load by the event is provided (602). The electronic device 1 may continuously monitor each of loads provided in the plurality of regions, and may predict a load amount to be provided in each of the plurality of regions in the future. That is, load information acquired by the electronic device 1 may be a load that has already occurred and/or a load that will additionally occur for each game server.

When the electronic device 1 acquires load information of each game server, the electronic device 1 determines a grade of a load size of a handover server (603). The handover server is a game server that transfers a cell to a takeover server, and is a game server responsible for a region adjacent to a region of the takeover server. When one cell is transferred from the handover server, the number of cells of the takeover server may be increased by one.

Regarding the grade of the load size, the grade of the load size referred to in the embodiments will be described in greater detail below with reference to FIG. 7.

The electronic device 1 of an embodiment may use the following setting value for the sake of an operation for cell transfer. The setting value below is a reference value for dividing the grade of the load size by each section, and may be adjusted to an appropriate value, based on the performance of the electronic device 1, whether a service speed is met, and statistical data of an appropriate load. The load size is arranged in ascending order as follows.

A bottom load (L_bottom) is the minimum load size the game server must have. For the electronic device 1 to create a variable server for cell transfer, the variable server to be created must be capable of processing a load greater than the bottom load.

A low load (L_low) is a reference value greater than the bottom load, and when a game server is in a state less than the low load, it is sufficient to receive cell transfer from other game servers. When a load of the game server is less than the low load, the game server may receive a cell from a lower game server compared to the game server or the same-rank game server.

A high load (L_high) is a reference value greater than the low load, and when the game server is in a state greater than the high load, a cell is transferred to another game server. When a load of the game server is greater than the high load, the game server may transfer a cell to an upper game server compared to the game server or the same-rank game server.

A load condition between the low load and the high load is called an appropriate load. The appropriate load is a sufficient state in which a load processed by the game server is neither small nor large. When the load of the game server is within an appropriate load range, cell transfer is not attempted in principle. However, the cell transfer may occur according to a predetermined condition for the purpose of minimizing and/or reducing a synchronization load. This will be described in greater detail below with reference to FIG. 11 and FIG. 12.

A top load (L_top) is the maximum load the game server may have. The game server cannot present a normal service when having a load greater than the top load. Accordingly, when a load state is a state greater than the high load and less than the top load, the game server attempts cell transfer, or requests the establishment of a variable server to balance a load.

According to an embodiment, the load size of the game server may be classified into a first section, a second section, or a third section. The first section may be between the bottom load and the low load, the second section may be between the low load and the high load, and the third section may be between the high load and the top load. An operation of each game server for load balancing may be determined according to a grade (section) of a measured load.

According to an embodiment, the load size of the game server 10 may belong to any one of the first section which is a load range smaller than an appropriate load range, the second section belonging to an appropriate load range, or the third section which is a load range greater than the appropriate load range.

In the present embodiment, the electronic device 1 determines to which section a load of the handover server belongs, and attempts cell transfer, based on the determination.

According to an embodiment, when the load of the handover server belongs to the third section, the electronic device 1 may create or provide a variable server (604). After creating/providing the variable server, the electronic device 1 controls the handover server to transfer a cell to the variable server (605).

According to an embodiment, when the load of the handover server belongs to the third section, the electronic device 1 controls the handover server to transfer a cell to the takeover server (605).

According to an embodiment, when the load of the handover server belongs to the first section, the electronic device 1 may prevent cell transfer from occurring in the handover server, and performs load monitoring for each of the plurality of regions (606).

According to an embodiment, when the load of the handover server belongs to the second section, the electronic device 1 attempts cell transfer under a predetermined condition (607). A reference numeral 607 refers to the cell transfer for reducing a synchronization load, and refers to a description of FIG. 10.

According to an embodiment, the electronic device 1 may include a first game server 11 which executes a first event occurring in a first region allocated a plurality of cells, and at least one second game server 12 which executes a second event occurring in a second region adjacent to the first region. At this time, any one of the first game server 11 and the at least one second game server 12 may be the scaling server 100. The processor 50 allows the first game server 11 and the at least one second game server 12 to transfer a cell and process load balancing. The processor 50 may control the first game server 11 and the at least one second game server 12 to transfer at least one cell between the first region and the second region, based on a first load by the first event and a second load by the second event. For example, when the first game server 11 is the scaling server 100, the processor 50 may control the second game server 12 to transfer at least one cell for which any one of the at least one second game server 12 is responsible, to the scaling server 100. The processor 50 may determine the load size of the first game server 11 and the second game server 12 to determine the direction of cell transfer, and determine to which section among the first section, the second section and the third section each load size belongs.

As described above, the electronic device 1 determines the direction of cell transfer, based on the load size of each game server 10. Hereinafter, various methods of cell transfer based on the directionality will be described in greater detail with reference to FIG. 8, FIG. 9 and FIG. 10.

Figure 8:
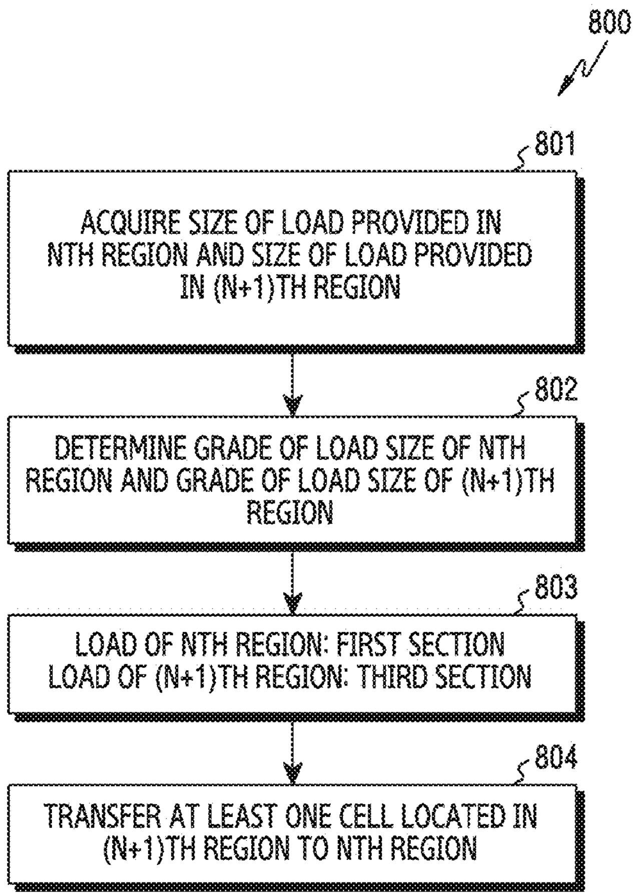
FIG. 8 is a flowchart illustrating an example method of operating an electronic device when a lower game server has a high load according to various embodiments.

FIG. 8 is a flowchart illustrating an example method of operating an electronic device when a lower game server has a high load according to various embodiments.

The electronic device 1 may acquire the size of a load provided in an nth region and the size of a load provided in an (n+1)th region at predetermined intervals (801). That is, the electronic device 1 may acquire the size of a load of each game server 10 having a region level difference of 1 and responsible for an adjacent region, and transfer a cell from a lower region to an upper region.

The electronic device 1 may determine a grade of the load size of the nth region and a grade of the load size of the nth region (802). Refer to FIG. 7 for a criterion for dividing the grade.

When the load in the nth region belongs to a first section, and the load in the (n+1)th region belongs to a third section (803), the electronic device 1 allows at least one cell in the (n+1)th region to be transferred to the nth region (804). That is, the electronic device 1 may allow a lower game server that is processing a relatively large load to transfer a cell to an upper game server, and perform load balancing.

When n=1, the electronic device 1 may control the game server 10 to transfer a cell to the scaling server 100. When the size of a load provided in a second region belongs to the third section, and the size of a load provided in a first region adjacent to the second region belongs to the first section, the electronic device 1 of an embodiment may control at least one game server 10 so that at least one cell located in the second region is transferred to the first region. When this process continues, the scaling server 100 may process more than an appropriate load, and present a request signal for newly establishing a variable server.

When n=2, the electronic device 1 may control the third game server 13 so that a cell is transferred to the second game server 12. When the size of a load provided in a third region belongs to the third section, and the size of a load provided in a second region adjacent to the third region belongs to the first section, the electronic device 1 of an embodiment controls the third game server 13 so that at least one cell located in the third region is transferred to the second region. That is, the electronic device 1 transfers a cell from the lower game server to the upper game server, based on the directionality.

Meanwhile, the electronic device 1 may allow cell transfer to occur even between game servers having equal region levels. When the size of a load provided in a (2-1)th region belongs to the third section, and the size of a load provided in a (2-2)th region belongs to the first section, the electronic device 1 of an embodiment may control the game server 10 so that at least one cell located in the (2-1)th region is transferred to the (2-2)th region. The (2-1)th region and the (2-2)th region are the game servers 10 having equal region levels, and in principle, correspond to a relationship in which cell transfer does not occur. However, even though the electronic device 1 has equal region levels between the game servers 10, when there is a relative difference of the load size, the electronic device 1 may perform cell transfer. The present embodiment may be supplementally applied to where cell transfer cannot occur between adjacent upper and lower game servers (when a load difference is relatively small), and increase the utilization of load balancing.

Before cell transfer occurs, the electronic device 1 may check whether there is a set of transferable cells, allow the handover server to request cell takeover to the takeover server, and perform cell transfer when an approval message is received from the takeover server. The electronic device 1 of an embodiment may perform cell transfer when at least one of the following first to fifth conditions is satisfied.

First condition: at least one cell to be transferred is adjacent to a responsible region of the takeover server.

Second condition: synchronization load of the handover server after cell transfer<S_limit Third condition: Synchronization load of the handover server after cell transfer<S_limit Fourth condition: When the takeover server is an upper server than the handover server, a load of the takeover server<L_top (top load)

Fifth condition: When the takeover server is not the upper server than the handover server, the load of the takeover server<L_low (low load)+M_max (S_limit is an upper limit of a synchronization load of each game server after cell transfer, and the cell transfer is performed only when the synchronization load of each game server may become smaller than S_limit after the cell transfer. M_max is a load (transfer cost) provided during cell transfer).

The first condition is a condition for simplifying cell transfer in relation to a responsible region of the game server 10, and the second and third conditions are conditions for reducing the entire load of the game server 10 by preventing a synchronization load from exceeding an upper limit after cell transfer. The fourth condition is a condition for preventing a top load of the takeover server after cell transfer, and the fifth condition is a condition for limiting a load of the takeover server not to be excessive when the takeover server is not an upper server. When there is no restriction such as the fifth condition between game servers having equal region levels, a separate load by a frequent cell transfer may be provided. That is, when there is not fifth condition, the game server experiences a fluctuation phenomenon of repeating a high load state and a low load state. On the other hand, since the game server may be overloaded when the load is not reduced for a long time in the high load state, it is preferable to transfer a relatively large load to the upper server. The electronic device 1 may prevent the fluctuation phenomenon by allowing a large-scale load transfer only to the upper server unidirectionally.

A handover server checks whether there is at least one cell that satisfies at least one of the first to fifth conditions with respect to a takeover server located in an adjacent region, and finds at least one cell having the smallest internal load and/or synchronization load, and then requests to the adjacent takeover server.

When the electronic device 1 cannot find a set of cells that satisfies the first to fifth conditions in a high load state, the takeover server (or scaling server) may add a variable server by itself and then divide and transfer a responsible region to the variable server.

The reason the handover server finds at least one cell having the smallest internal load and/or synchronization load is to prevent and/or reduce a rapid load change by dividing and transferring a load as small as possible. Since the handover server sends a takeover request message to a plurality of adjacent takeover servers, the handover server may successively receive takeover approval messages from the plurality of takeover servers. When the handover server receives a plurality of takeover approval messages from the takeover server, the handover server may perform cell transfer according to the received order.

When the handover server has an appropriate load at a time currently ongoing cell transfer is all completed while the handover server is performing the cell transfer, the handover server may disregard a takeover approval message received thereafter. This is because there is no need for additional cell transfer when the handover server has the appropriate load.

When a transfer target cell approved later and a currently transferring cell are partially overlapped while the handover server is performing cell transfer, the handover server may disregard a takeover approval message received later. The handover server cannot proceed with a new approval case when the transfer target cell overlaps with the currently transferring cell.

When there is a currently ongoing cell transfer case, the takeover server receiving a takeover request rejects the takeover request to avoid a contention situation, but approves the takeover request otherwise. The above process may be repeated periodically while the game server is in a high load state.

Figure 9:
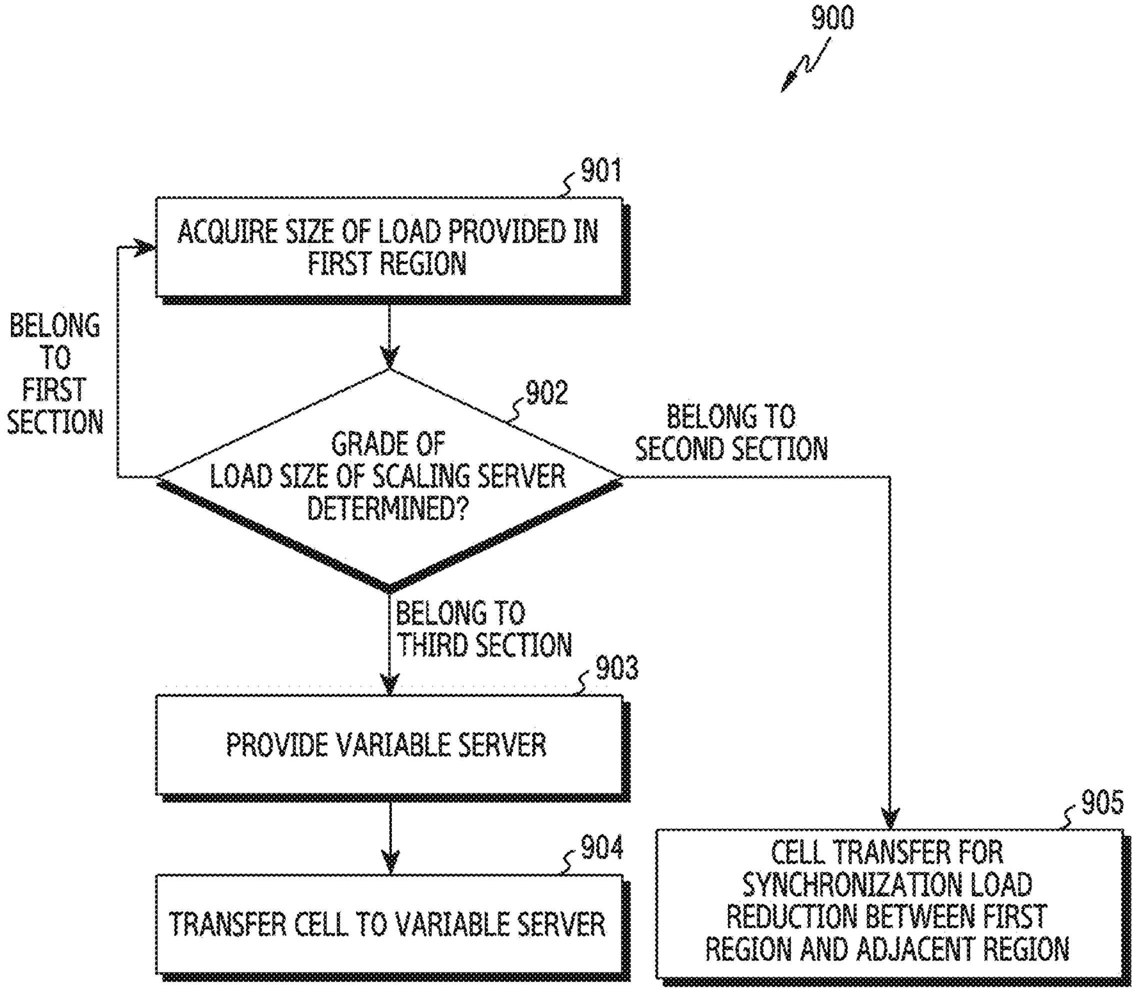
FIG. 9 is a flowchart illustrating an example method of operating an electronic device when a scaling server has a high load according to various embodiments.

FIG. 9 is a flowchart illustrating an example method operating of an electronic device when a scaling server has a high load according to various embodiments.

The electronic device 1 acquires the size of a load provided in a first region (901). The first region is a region allocated a plurality of cells for which the first game server 11 is responsible, and the first game server 11 corresponds to the scaling server 100.

The electronic device 1 determines a grade of the load size of the scaling server 100 (902). The scaling server 100 corresponds to the highest server among the game servers 10 and, in principle, cannot transfer a cell to another game server according to the directionality of cell transfer.

When the size of the load provided in the first region belongs to a third section, the electronic device 1 of an embodiment creates a variable server (903), and controls the scaling server 100 so that at least one cell located in the first region is transferred to the variable server (904).

When the size of the load provided in the first region belongs to a second section, the electronic device 1 of an embodiment may perform cell transfer for synchronization load reduction between the first region and an adjacent region (905). That is, even if the scaling server 100 is not in a high load state, the electronic device 1 may perform the cell transfer under the condition that the synchronization load may be reduced in a relationship between an adjacent second region. The cell transfer for the synchronization load reduction will be described with reference to FIG. 10.

When the size of the load provided in the first region belongs to a first section, the electronic device 1 of an embodiment continuously monitors the load provided in the first region.

Meanwhile, a variable server of an embodiment may be created, when the scaling server 100 has a high load, when one of the game servers 10 has a top load, when any one of the game servers has a high load but cannot specify a set of transferable cells, or when the synchronization load is higher than an upper limit value of the synchronization load in a state where any one game server is in an appropriate load or low load state.

Figure 10:
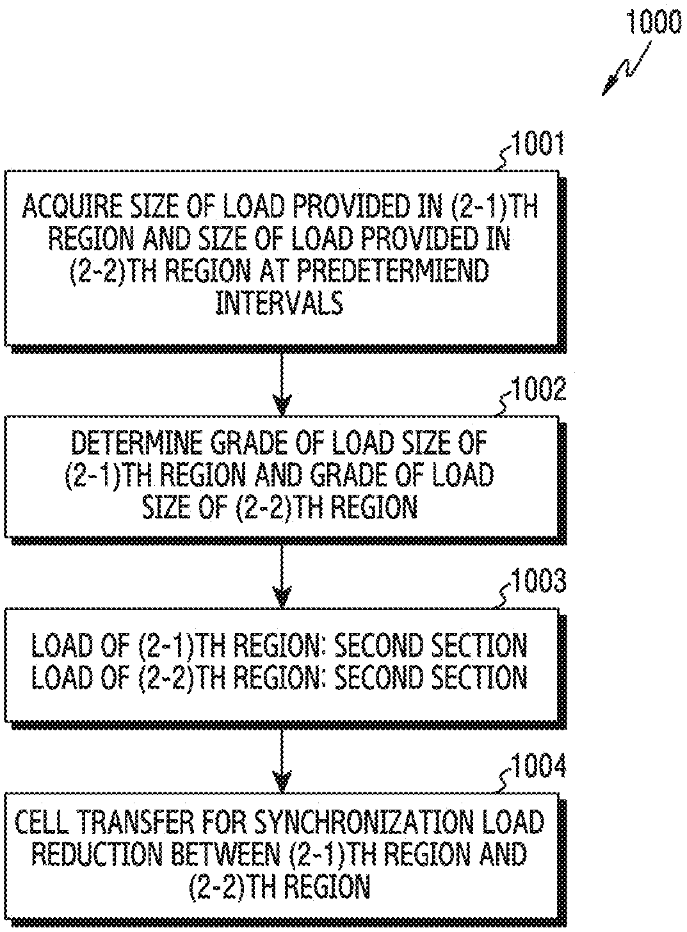
FIG. 10 is a flowchart illustrating an example method of operating an electronic device when a game server has an appropriate load according to various embodiments.
Figure 11:
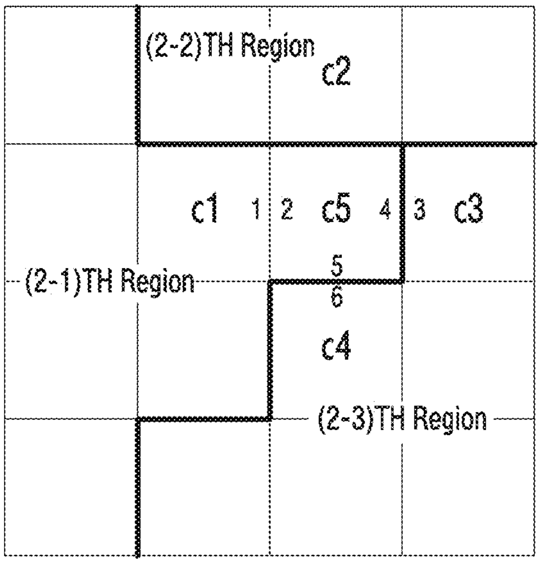
FIG. 11 and FIG. 12 are diagrams illustrating a synchronization load reduction dependent on cell transfer according to various embodiments.
Figure 12:
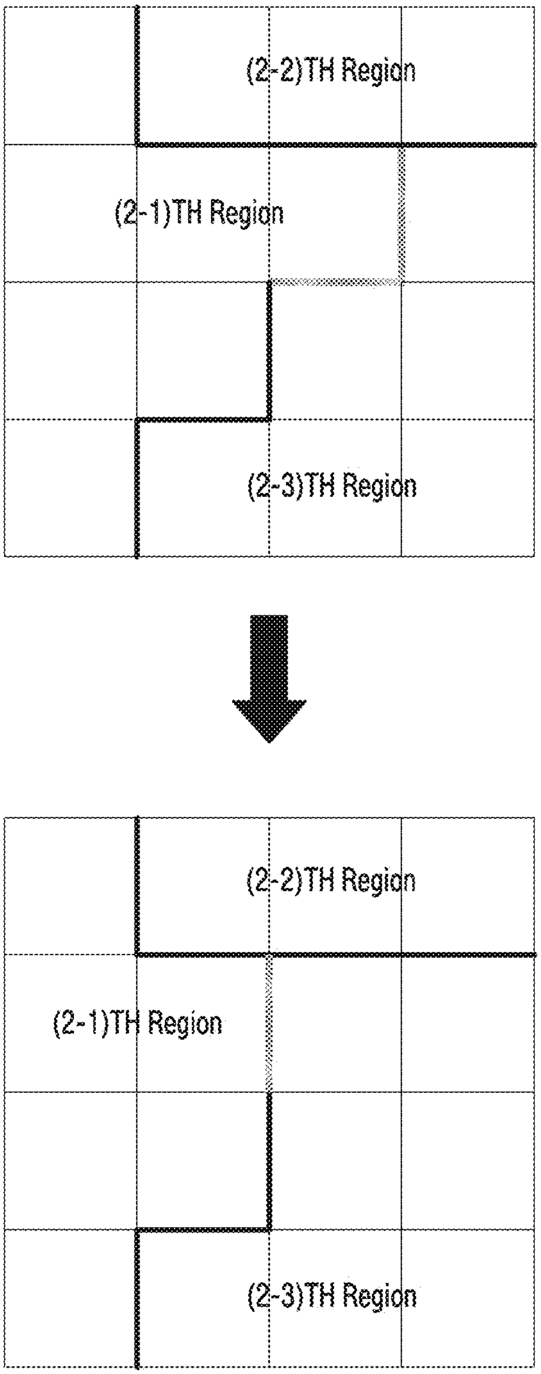

FIG. 10 is a flowchart illustrating an example method of operating an electronic device when a game server has an appropriate load according to various embodiments, and FIG. 11 and FIG. 12 are diagrams illustrating synchronization load reduction dependent on cell transfer according to various embodiments.

Prior to a description of the flowchart of FIG. 10, the principle of the synchronization load reduction dependent on the cell transfer will be described with reference to FIG. 11 and FIG. 12.

As shown in FIG. 11, when a first cell (C1) and a second cell (C2) are located in different game servers ((2-1)th region and (2-2)th region), an additional load is provided due to event synchronization between the two game servers. Therefore, the loads provided in the first cell (C1) and the second cell (C2) will be greater than internal loads (I(C1) and I(C2)), respectively. This difference corresponds to a synchronization load. The synchronization load may be separately estimated for each cell boundary, and may be provided only when a corresponding cell boundary is a boundary between the game servers.

Assuming that four sides of the first cell (C1) being a square are e1, e2, e3, and e4, a synchronization load of a cell is zero, when all of the four sides are within the same region. When the overall load of the first cell (C1) is L(C1), the following relational expression may be established.

$$L(C1)=I(C1)$$

On the other hand, when the three sides (e1, e2, and e3) of the first cell (C1) being the square are within the same region, and only the e4 is shared at a boundary of another region, a synchronization load of the first cell (C1) is provided only at the e4. When a cell adjacent at the e4 to the first cell (C1) is called the second cell (C2), portion processed by the first cell (C1) among synchronization loads provided at the e4 may be defined as S(C1, C2). The synchronization load of the first cell (C1) may be defined according to the following relational expression.

$$S(C1,C2)=L(C1)-I(C1)$$

The internal load and the synchronization load may be predicted values which are estimated from character distribution inside and around a cell. Therefore, S(C1, C2) and S(C2, C1) may be estimated even if two adjacent cells belong to the same region, and synchronization loads are not actually provided between them.

The estimated value is a synchronization load expected to be provided between the first cell (C1) and the second cell (C2) when they are in different regions. The electronic device 1 of an embodiment may compare synchronization load values estimated at respective cell boundaries, determine which cell boundary is used as a region boundary to lower a synchronization load, and continuously transfer a cell in a direction of lowering the synchronization load.

In principle, cell transfer to reduce a synchronization load occurs when both a handover server and a takeover server belong to a second section of an appropriate load and load size. The handover server and the takeover server, which are adjacent to each other and have appropriate loads, periodically perform tasks to lower the synchronization load. For example, the first game server 11 may periodically check whether there is a set of cells satisfying the following condition in its responsible region with respect to the adjacent second game server 12, and when the condition is satisfied, the first game server 11 may transfer at least one cell to the second game server 12 and reduce a synchronization load between the two game servers.

First condition: At least one cell to be transferred is adjacent to a responsible region of the takeover server.

Second condition: After cell transfer, it becomes a state in which the overall load of the takeover server<L_high (high load) and the overall load of the handover server>L_low (low load).

Third condition: (before cell transfer, synchronization load of takeover server+synchronization load of handover server)−(after cell transfer, synchronization load of takeover server+synchronization load of handover server)>M(C). M(C) is a load cost required to transfer a cell.

Fourth condition: Selecting a cell set having the smallest M(C) among cell sets satisfying all of the first to third conditions.

M(C) is a function properly defined in consideration of a load which will be provided to synchronize states of characters located in a transfer target cell to the takeover server. This is to prevent adverse effects from being rather produced by increasing a character state synchronization load in order to lower an event synchronization load. A cell transfer process for lowering the synchronization load will be described with reference to FIG. 11.

Referring to FIG. 11, some of responsible regions ((2-1)th region, (2-2)th region, and (2-3)th region) of three adjacent game servers are shown, thick lines indicate boundaries between the game servers, and thin lines indicate cell boundaries. For convenience of description, some cells are indicated by c1 to c5. Numerals around the cell boundary refer to synchronization loads estimated for a corresponding cell boundary.

In FIG. 11, synchronization loads of a responsible cell (c5) of a (2-1)th game server estimated at a boundary with a (2-3)th game server are $$S(c5,c3)=4, \text{ and}$$

$$S(c5,c4)=5.$$

And, synchronization loads of the (2-3)th game server estimated at a boundary with the cell (c5) are $$S(c3,c5)=3, \text{ and}$$

$$S(c4,c5)=6.$$

When the cell (c5) is transferred to the (2-3)th game server, the synchronization loads disappear, because the cell (c3), the cell (c4), and the cell (c5) belong to the same game server. Instead, since the cell (c1) and the cell (c5) belonging to the same game server belong to different game servers, new synchronization loads are provided as shown below:

$$S(c1,c5)=1,$$

$$S(c5,c1)=2.$$

Since the cells (c2) and (c5) belong to different game servers both before and after the transfer of the c5, synchronization loads between them do not change. When the cell (c5) is transferred to the (2-3)th game server, it may be appreciated that the synchronization loads between the (2-1)th game server and the (2-3)th game server will be reduced by 15 from 4+5+3+6=18 to 1+2=3. Since there is no other boundary that is changed by the transfer of the cell (c5) in addition to this, the reduction of a total of 15 synchronization loads may be predicted by the transfer of the cell (c5).

When a transfer cost (M(c5)) required to transfer the cell (c5) is less than 15, the (2-1)th game server may attempt to transfer the cell (c5) to the (2-3)th game server (FIG. 12). The (2-1)th game server makes a takeover request to the (2-3)th game server having a cell (C) with the smallest M(C) among all cell sets (C) that satisfy the above conditions for the (2-3)th game server. The (2-3)th game server may also find whether there is a cell to be transferred to the (2-1)th game server on the same basis and, when there is no cell, the (2-3)th game server may take over the cell (C) by accepting the request of the (2-1)th game server. When the (2-3)th game server also has a cell set to be handed over to the (2-1)th game server, it is checked whether the corresponding set is in contact with a cell set to be taken over from the (2-1)th game server. When they are not in contact with each other, because the two transfer target cell sets do not affect each other's synchronization loads, each transfer is performed. When the two sets are in contact with each other, because the transfer of the one set changes a transfer condition of the other set, both cannot be transferred. Therefore, only the one with a greater transfer gain is transferred, and the other is canceled. The benefit of transfer is a value of a synchronization load reduced by cell transfer minus a transfer cost required for transfer. This process may be repeated periodically for all adjacent game servers.

In principle, the above process may be performed when both adjacent game servers have appropriate loads. Also, the above process may be performed when the two game servers have equal region levels, but may also be performed between the two game servers having the same region level in an upper and lower relationship.

Referring to FIG. 10, the electronic device 1 of an embodiment acquires the size of a load provided in a (2-1)th region and the size of a load provided in a (2-2)th region at predetermined intervals (1001), and determines the grade of the load size of the (2-1)th region and the grade of the load size of the (2-2)th region (1002).

When both the load of the (2-1)th region and the load of the (2-2)th region belong to a second section (1003), the electronic device 1 may perform cell transfer for a synchronization load between the (2-1)th region and the (2-2)th region (1004).

According to an embodiment, the electronic device 1 may acquire the size of the load provided in the (2-1)th region and the size of the load provided in the (2-2)th region at predetermined intervals, and control at least one game server so that at least one cell adjacent to a boundary between the (2-1)th region and the (2-2)th region is transferred between the (2-1)th region and the (2-2)th region, when all the size of the load provided in the (2-1)th region and the size of the load provided in the (2-2)th region belong to the second section. After the cell transfer, the synchronization loads provided in the (2-1)th region and the (2-2)th region are reduced.

Meanwhile, the electronic device 1 may perform cell transfer between upper and lower game servers to reduce a synchronization load. According to an embodiment, the electronic device 1 may acquire the size of a load provided in a second region and the size of a load provided in a third region at predetermined intervals. The second region is a responsible region of the second game server, and the third region is a responsible region of the third game server which is a lower game server than that of the second region. When the size of the load provided in the second region and the size of the load provided in the third region both belong to a second section (appropriate load), the electronic device 1 may control at least one game server so that at least one cell adjacent to a boundary between the second region and the third region is transferred between the second region and the third region. After the cell transfer, the synchronization loads provided in the second region and the third region are reduced.

FIG. 13 is a diagram illustrating an example cell transfer operation according to conditions between game servers according to various embodiments.

FIG. 13 summarizes a load transfer operation dependent on an upper and lower relationship between adjacent game servers and a load state. A handover server is the subject that transfers a cell, and a takeover server is the subject that transfers the cell from the handover server.

In a state in which the handover server has a high load (third section or more), the handover server may attempt cell transfer to an upper game server regardless of a load state of the handover server which is the upper game server.

In a state where a lower game server has a low load (first section or less), the handover server may attempt cell transfer to the lower game server regardless of a state of the handover server.

In a state where the handover server itself has a high load and an adjacent game server has a low load, the handover server may attempt cell transfer to the low-load takeover server from the high load regardless of an upper or lower rank.

When two adjacent game servers all have appropriate loads, two adjacent game servers may perform cell transfer for synchronization load reduction.

Meanwhile, in the electronic device 1, when cell transfer is approved, the handover server delivers state information of characters located in a transfer target cell to the takeover server, and notifies this to a user terminal 90 having a character belonging to the corresponding cell. The user terminal 90 changes a connection to the takeover server instead of the handover server, and the takeover server processes an event occurring in the corresponding cell. A user input temporarily transmitted to the handover server after the cell transfer may be delivered from the handover server to and processed by the takeover server. Upon receiving a response message to the server change from the user terminal, the takeover server may determine that the transfer of the user terminal has been completed, and notify this to the handover server. At this time, the handover server determines that there is no need to maintain the state information of the corresponding character any longer, and deletes it.

According to an embodiment, in a state where the character of the user terminal 90 belongs to at least one cell, when there is a change of a server to which the character belongs, the electronic device 1 may notify the server change to the user terminal. In detail, the electronic device 1 may control the communication module 40 and request the user terminal 90 to connect to the takeover server, and the user terminal 90 may present a response message to the server change to the electronic device 1.

Meanwhile, in the foregoing, a method of minimizing/reducing the overall load in the electronic device 1 through cell transfer between regions (or between game servers) has been described. Balancing a load between the game servers through cell movement corresponds to minimizing/reducing the existing load. In order to reduce the entire load of the electronic device 1, it is also important to prevent an unnecessary load in addition to balancing the load. Hereinafter, a method of minimizing/reducing a load by event synchronization and minimizing/reducing a load that will be provided in the future will be described in greater detail.

Figure 14:
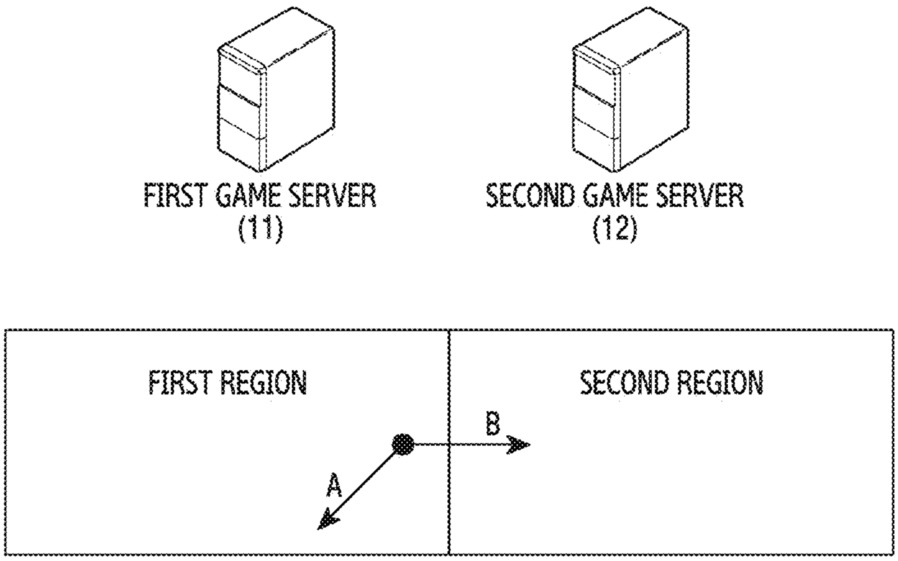
FIG. 14 is a diagram illustrating event synchronization between game servers according to various embodiments.

FIG. 14 is a diagram illustrating event synchronization between game servers according to various embodiments.

In the electronic device 1 in which balanced processing is implemented by a plurality of game servers, the synchronization of events affecting adjacent game servers must be additionally considered. The range of influence of an event may vary depending on the type and circumstances of the event. For convenience of description, a first-person shooter (FPS) game will be described as an example.

As shown in FIG. 14, when a character located in a region of a first game server 11 shoots in an A direction and a B direction, respectively, the range of influence of shooting of the A direction is limited to a first region, but the range of influence of shooting of the B direction corresponds to the first region and a second region.

Accordingly, the shooting event of the A direction may be processed independently in the first game server 11, but the shooting event of the B direction must be processed together in the first game server 11 and the second game server 12. That is, the game server 10 must determine whether an event occurring within its responsible region may affect other regions (other game servers), and when it affecting, the game server 10 must deliver event information to the affected game server to allow to process it. This series of processes is called event synchronization.

Meanwhile, the game server 10 needs to sort events received from a user terminal in order of time of occurrence, and process them according to the order of time. However, due to a transmission delay difference between the user terminal 90 and the game server 10, an event that occurs first between the user terminals 90 may be later received by the game server 10. Accordingly, when two or more events occur, it is necessary to delay the received events for a predetermined time instead of immediately processing them, in order to process them in the order of occurrence. The electronic device 1 synchronizes time between the game server 10 and the user terminal 90, records a time of occurrence of an event occurring in the user terminal 90 that is a client, and transmits it to the game server 10.

The game server 10 executes an event after a predetermined time, based on a time point of occurrence recorded in the event, and presents the execution result to the user terminal 90. The predetermined time is the maximum transmission delay time allowed between the user terminal and the game server, and may be defined as a first time (D_max). The first time corresponds to a value that may be set in consideration of characteristics of services presented by the electronic device 1.

When receiving an event before the first time elapses after the occurrence of the event, the game server 10 may process the event according to the following relationship. Depending on this relationship, the occurrence order and execution order of events may be corrected.

$$Te(E)-Tg(E)=D\max$$

(Tg(E)=time point when event (E) occurs, Te(E)=time point when event (E) will be executed, and Dmax=maximum allowable transmission delay between user terminal and game server)

When an actual delay time applied between the game server 10 and the user terminal 90 is greater than the first time, it cannot be guaranteed that events are executed in the order of occurrence of the events, because a reception time point is later than a time point when the event should be executed. On the other hand, when the first time (D_max) is set too large, a service quality may be degraded, because a processing delay of the event is too large.

As already described, the present disclosure divides the entire map for presented services into a plurality of regions, and different game servers 10 are responsible for the respective regions. In this case, there is a case where an event occurring in one game server may affect other game servers.

In this case, the game server receiving the event should be able to propagate the event to other game servers affected by the event and allow the other game servers to process the event. This is called event synchronization between the game servers. The event synchronization may also be performed between the game server 10 and the user terminal 90, but in the present disclosure, the event synchronization refers to the event synchronization between the game servers 10.

The event synchronization must be completed before enough time so that the game server receiving the event may process the event at a specified execution time.

The result of the event may be known by evaluating the received event. At event synchronization, in a state in which this result is determined, the event must be propagated so that the game server receiving it may process the event. For example, when the first game server 11 receives a first event, the first game server 11 delivers the first event to the second game server 12. Thereafter, the second game server 12 must evaluate whether the first event is affected by a second event occurring in the second game server 12, and present the evaluation result to the first game server 11. After receiving the evaluation result, the first game server 11 may determine whether to execute the first event.

Since the range of influence of the event is also determined by the event evaluation result, which adjacent region the corresponding event will affect is also determined by the event evaluation result. Also, since the event evaluation result may be affected by its preceding event, the event evaluation result may change depending on a time point of evaluation. Therefore, the corresponding event must be evaluated after all preceding events occurring earlier have been processed, so that an accurate result of the corresponding event may be obtained.

On the other hand, since additional message transmission is required to correct executed event synchronization and this leads to an increase of load and an increase of delay, the present disclosure delays synchronization execution between game servers as long as possible within the limit of being completed before sufficient time so that the game server receiving the event may process the event at a predetermined execution time.

Prior to describing an embodiment of delaying the synchronization execution, a cancellation message for preventing contradictory events between events related to synchronization between independent events will be described in greater detail below with reference to FIG. 15 and FIG. 16, to aid in the understanding of embodiments of the present disclosure.

Figure 15:
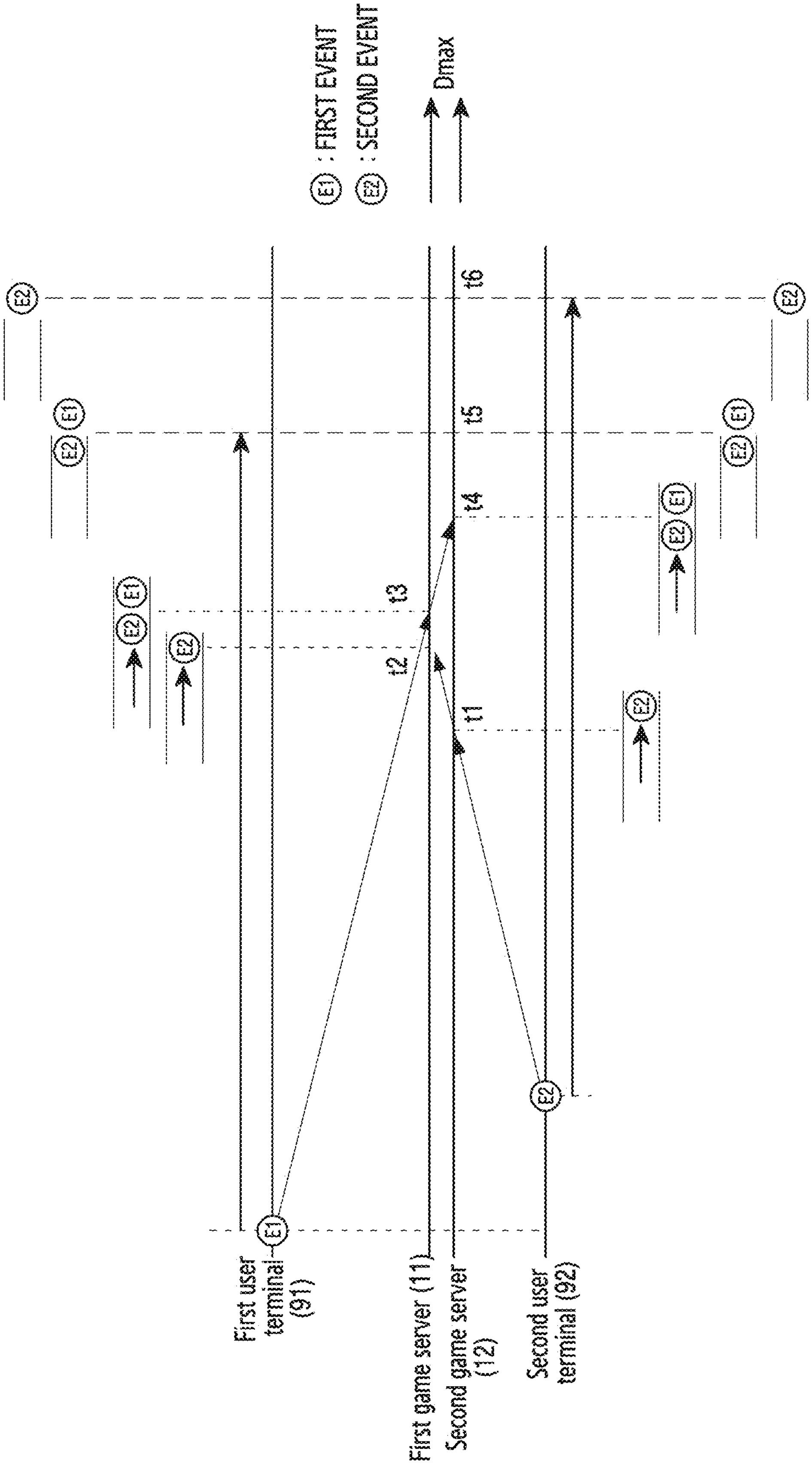
FIG. 15 is a diagram illustrating synchronization between independent events between game servers according to various embodiments.

FIG. 15 is a diagram illustrating example synchronization between independent events between game servers according to various embodiments.

Since the event processing result varies depending on the processing order, processing must be performed in the occurrence order for the sake of the correct result.

Since a message transmission delay for an event received by the game server varies every user terminal, and varies every transmission even for the same user terminal, the received event must be processed after being sorted in the order of occurrence, not in the order of reception.

The user terminal includes an event occurrence time point in a message for an event and transmits the message. The game server sorts the events, based on this, and processes the events in order.

In order for a time recorded by the user terminal to indicate the same time in the game server, synchronization between the user terminal and the game server is required. For time synchronization, a network time protocol (NTP) or a method similar to this may be used.

The game server does not immediately process the received event, and needs to stand by considering that an event occurring earlier may be received later. However, since the game server cannot stand by indefinitely, it is assumed that a specific time is set and all events will be received within the specific time after they occur. At this time, the assumed specific time may be defined as the maximum transmission delay time (D_max).

Since an event requiring synchronization must be completed to be received by the game server affected by the event before D_max time after event occurrence, the synchronization must start before the D_max.

Referring to FIG. 15, a situation is illustrated in which in a state in which there is a first game server 11 and a second game server 12, a first user terminal 91 is connected to the first game server 11, a second user terminal 92 is connected to the second game server 12, and a first event (E1) and a second event (E2) occur in the first user terminal 91 and the second user terminal 92, respectively. A distance between the user terminal and the game server or a distance between the game servers of FIG. 15 has been expressed in proportion to a transmission delay time.

At the same time that the second event (E2) is received by the second game server 12 at t1 and enters a queue, the second event (E2) is determined to affect the first game server 11 and is propagated to the first game server 11 at t2, and the first game server 11 receives the second event (E2) and registers it to the queue.

At the same time that the first event (E1) is also received by the first game server 11 at t3 and enters a queue, the first event (E1) is determined to affect the second game server 12 and is propagated to the second game server 12 at t4, and the second game server 12 receives the first event (E1) and registers it to the queue.

At this time, the first event (E1) and the second event (E2) are executed in each of the first game server 11 and the second game server 12 at a time point when D_max elapses. That is, for events occurring within a range of D_max, it may be guaranteed that the event execution order is the same as the event occurrence order.

Meanwhile, unlike FIG. 15, when different events do not affect each other, a synchronization method using D_max is not a problem, but when different events affect each other, a new problem may occur. In this regard, a description will be made with reference to FIG. 16.

Figure 16:
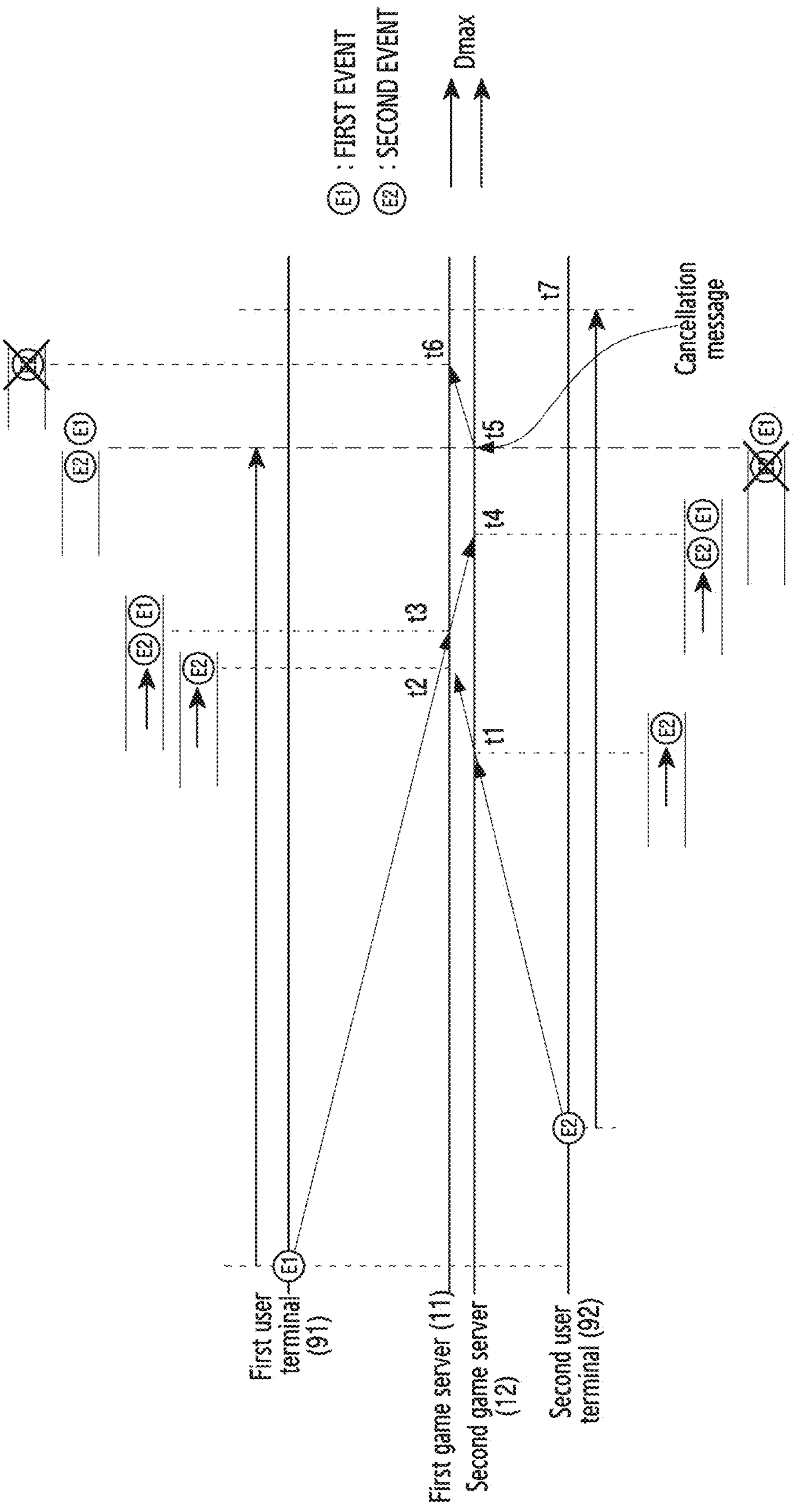
FIG. 16 is a diagram illustrating an example process of canceling any one of events occurring between game servers according to various embodiments.

FIG. 16 is a diagram illustrating an example process of canceling any one of events occurring between game servers according to various embodiments.

Referring to FIG. 16, a situation is shown in which a first event (E1) and a second event (E2) occur in each of a first user terminal 91 and a second user terminal 92, in a state in which there is a first game server 11 and a second game server 12, the first user terminal 91 is connected to the first game server 11, and the second user terminal 92 is connected to the second game server 12. It is a situation in which since the second event (E2) occurs earlier than the first event (E1), the second event (E2) has to be canceled.

Assume a situation where the second game server 12 has the first event (E1) and the second event (E2) in a queue at a time point t4, but while the first event (E1) is executed at a time point t5 according to a D_max limit, the second event (E2) is canceled and disappears from the queue.

At this time, the second event (E2) also stands by in a queue of the first game server 11, but since the first game server 11 does not know the evaluation result of the second game server 12, the first event (E1) will be executed at t5, without considering the evaluation result of the second game server 12. In some cases, the contradictory execution results may be provided.

For accurate evaluation between the events, the second game server 12 needs to send an additional message to the first game server 11. A signal transmitted at t5 corresponds to a cancellation message.

A load between the game servers may be provided due to the cancellation message. Accordingly, the electronic device 1 of an embodiment may use a method of delaying the transmission of an event message between the game servers within a possible limit. This will be described in greater detail below with reference to FIG. 17 and FIG. 18.

Figure 17:
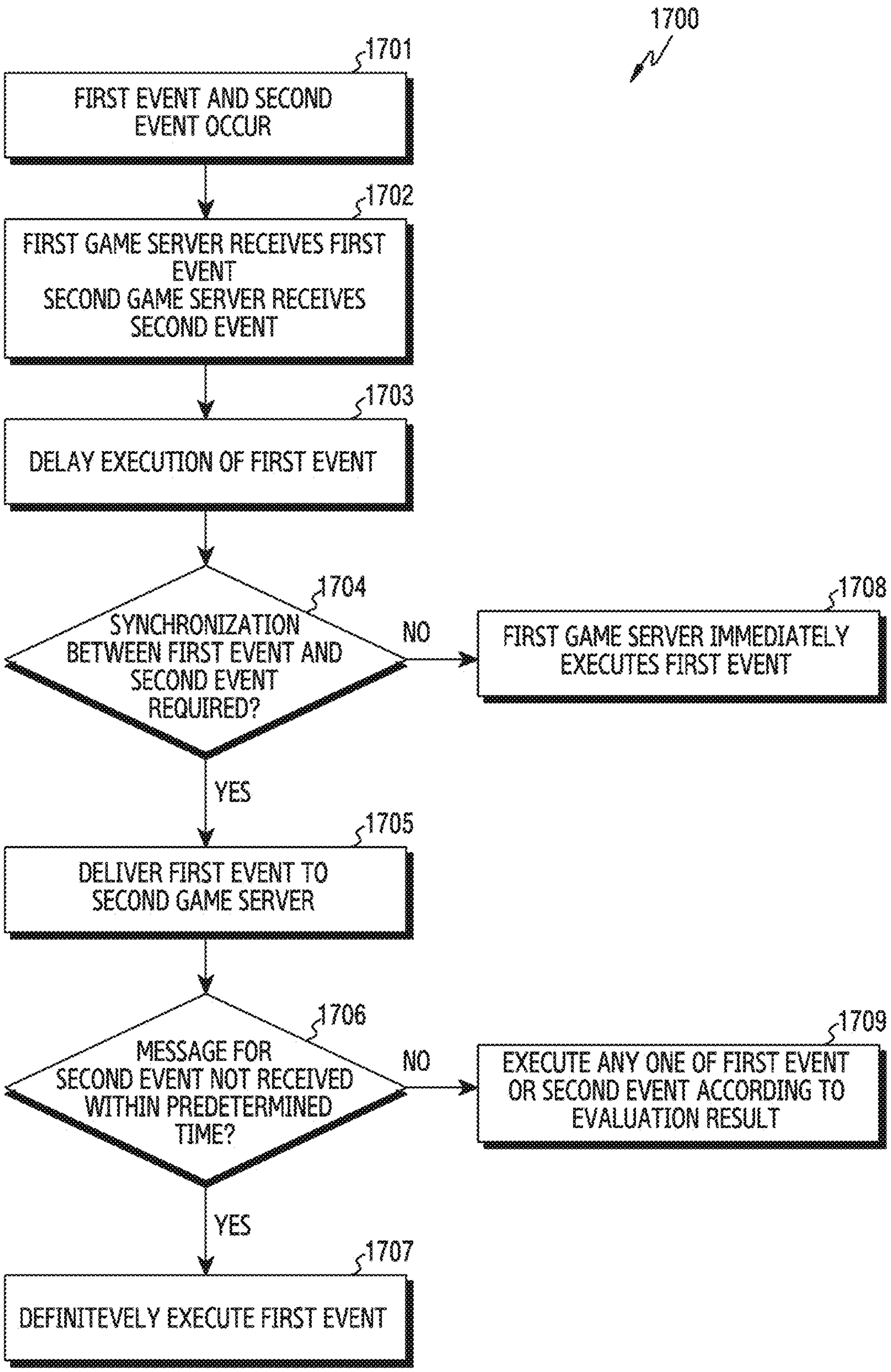
FIG. 17 is a flowchart illustrating an example method of operating an electronic device according to various embodiments.
Figure 18:
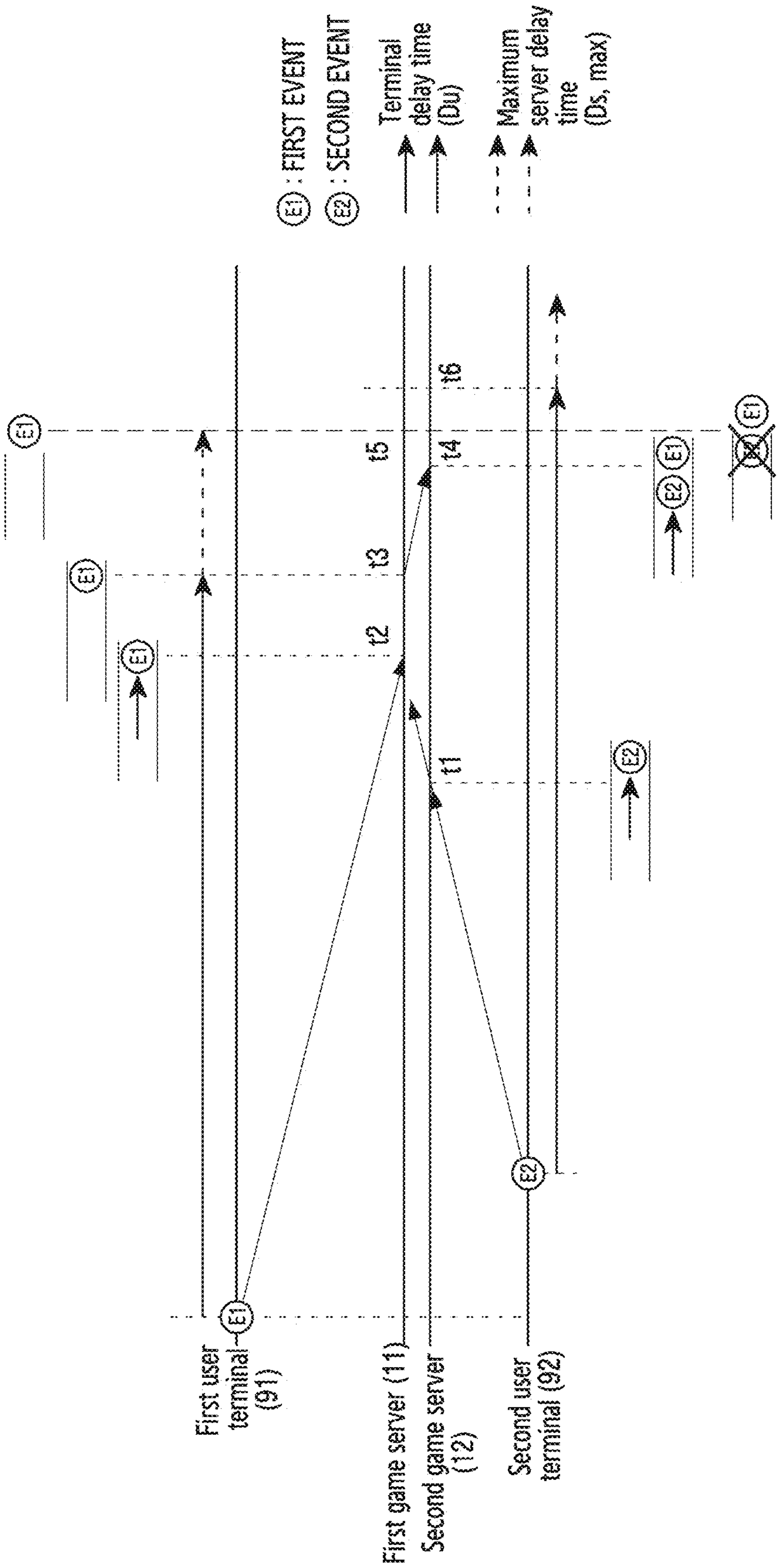
FIG. 18 is a reference diagram for the flowchart of FIG. 17.

FIG. 17 is a flowchart illustrating an example method of operating an electronic device according to various embodiments, and FIG. 18 is a reference diagram for the flowchart of FIG. 17.

The electronic device 1 of an embodiment delays synchronization execution between game servers as much as possible within a limit of being completed before a sufficient time so that an event may be processed at a predetermined execution time in a game server receiving the event. To this end, D_max, which is the maximum transmission delay time between a user terminal and the game server, may be divided into Du and Ds_max as follows.

$$D\ \mathrm{max}=Du+Ds\_\mathrm{max}$$

The 'Ds_max' is the maximum transmission delay time between the game servers to delay message transmission for event synchronization between the game servers. The 'Du' is a time point at which the event is evaluated based on a time point of event occurrence. At this time, when a synchronization time point of the event (E) is Ts(E), the following relational expression may be established.

$$Ts(E)=Tg(E)+Du$$

When a delay time (Ds) for event synchronization (propagation to other game servers) is less than the 'Ds_max', a time point (Tsc(E)) at which event synchronization is completed is smaller than a time point (Te (E)) at which the event should be executed. That is, the following relational expression may be established.

$$Tsc(E)=Tg(E)+Du+Ds<Te(E)=Tg(E)+D\ \mathrm{max}(=Du+Ds\_\mathrm{max})$$

Therefore, when the 'Ds_max' is set larger than an expected delay time (Ds) between the servers, the event synchronization may be performed before a sufficient time so that the game server receiving the event may process the event at a predetermined execution time. Also, in order to properly delay the synchronization execution, the 'Ds_max' should be set to a value larger than the 'Ds' and as small as possible.

First, referring to FIG. 18, a first event (E1) occurs in the first user terminal 91 connected to the first game server 11, and a second event (E2) occurs in the second user terminal 92 connected to the second game server 12. A first region for which the first game server 11 is responsible and a second region for which the second game server 12 is responsible are adjacent to each other.

As the evaluation result, it is determined that the first event (E1) and the second event (E2) affect each other between the first region and the second region, and a situation is assumed in which the second event (E2) has to be cancelled by the execution result of the first event (E1).

The first event (E1) occurring in the first user terminal 91 is received by the first game server 11 at t2, but is not immediately evaluated and stands by in a queue of the first game server 11 and then is evaluated at a time point (t3) at which the 'Du' elapses after the first event (E1) occurs. That is, when the game server receives an event, it does not immediately determine whether to propagate it to other game servers, but determines when Du elapses from when the event occurs.

As the evaluation result, the first game server 11 determines that synchronization is required for the second game server 12, and delivers the evaluation result for the first event (E1) to the second game server 12. When a synchronization delay time is less than the 'Ds_max', the first event (E1) may be executed simultaneously in the first game server 11 and the second game server 12 at a time point (t5). The first event (E1) may be received by the second game server 12 at a time point (t4), and be simultaneously executed in the first game server 11 and the second game server 12 at a time point (t5).

The second event (E2) is received by the second game server 12 at a time point (t1) and stands by in a queue to be synchronized at a time point (t6), but as the first event (E1) is executed at the time point (t5) before that, the second event (E2) is canceled. That is, the first event (E1) is definitively executed.

When the second game server 12 receives the second event (E2) and immediately synchronizes to the first game server 11, synchronization related to being canceled by the first event (E1) is required at t5, but since the synchronization of the second game server 12 for the second event (E2) has been delayed until t6, it is not required that cancellation synchronization occurs. In conclusion, since unnecessary event synchronization and event cancellation synchronization resulting from this do not occur, three synchronization messages may be reduced to one.

According to FIG. 18, since event synchronization between game servers is delayed to the maximum, there is no temporal room to cancel a synchronized event. Therefore, the event execution result is fixed to a result evaluated at a time point of synchronization.

Ideally, it is most fair and accurate that all events are evaluated at a time point of event execution, but the events are previously evaluated as much as Ds_max ahead of an execution time point in order to consider a synchronization delay between the game servers.

Referring to FIG. 17, when a first event and a second event occur in the first user terminal 11 and the second user terminal 12, respectively (1701), the first game server 11 receives the first event, and the second game server 12 receives the second event (1702).

Upon receiving the first event, the first game server 11 delays the execution of the first event (1703). Delaying the execution of the first event may be performed by delaying a propagation of the first event to the second game server 12.

When synchronization is required between the first event and the second event (Yes in operation 1704) (when the events affect each other), the electronic device 1 allows the first game server 11 to deliver the first event to the second game server 12 (1705), but when the synchronization is not required (No in operation 1704), the first game server 11 immediately executes the first event.

When a message for the second event is not received by the first game server 11 from the second game server 12 within a predetermined time (1706), the electronic device 1 allows the first game server 11 to definitively execute the first event (1707). When the message for the second event is received by the first game server 11 from the second game server 12 within a predetermined time, the electronic device 1 executes any one of the first event or the second event according to the evaluation result (1709).

The first event executed in 1707 is a definitive execution, and has no room for cancellation.

The electronic device 1 of an embodiment includes the first game server 11 that receives a first command for a first event from the first user terminal 91 and executes the first event occurring in a first region, and the second game server 12 that receives a second command for a second event from the second user terminal 92 and executes the second event occurring in a second region. The electronic device 1 may delay message transmission for synchronization between the first game server 11 and the second game server 12. The electronic device 1 may control the first game server 11 to execute or cancel the first event when a first time arrives from a time point when the first command is provided. In this case, the first time may be D_max, which is the maximum transmission delay time allowed between the user terminal and the game server. The electronic device 1 may control the first game server 11 so that the first game server 11 delivers the first event to the second game server 12 after receiving the first command from the first user terminal 91. In this case, the delivery of the first event may be delayed for a predetermined time. When the first game server 11 does not receive a message for the second event from the second game server 121 within a predetermined time from a time point when the first game server 11 delivers the first event, the electronic device 1 may control the first game server 11 and the second game server 12 so that the first event is executed. When the first event is executed, the execution of the first event is treated as definitive.

In order to definitively treat the execution of the first event, the electronic device 1 of an embodiment may control the second game server 12 so that the second event is canceled when the first event is executed.

Also, according to an embodiment, when the second event is canceled, the electronic device 1 may control the second game server 12 so that a cancellation message for the second event is not transmitted to the first game server 11.

In the above-described embodiments, the first time may be the maximum transmission delay time between a time point when the first command is provided and a time point when the first event should be executed. The first time is the maximum transmission delay time between the game server 10 and the user terminal 90. The first time has a value obtained by adding a predetermined time to a second time, and the second time may be the maximum transmission delay time between a time point when the first game server 11 receives the first event and a time point of synchronizing with the second game server 12.

According to an embodiment, the electronic device 1 may update the second time according to a predetermined cycle. The second time may be determined based on a load of each of the first game server 11 and the second game server 12 and a network load between the first game server 11 and the second game server 12.

Figure 19:
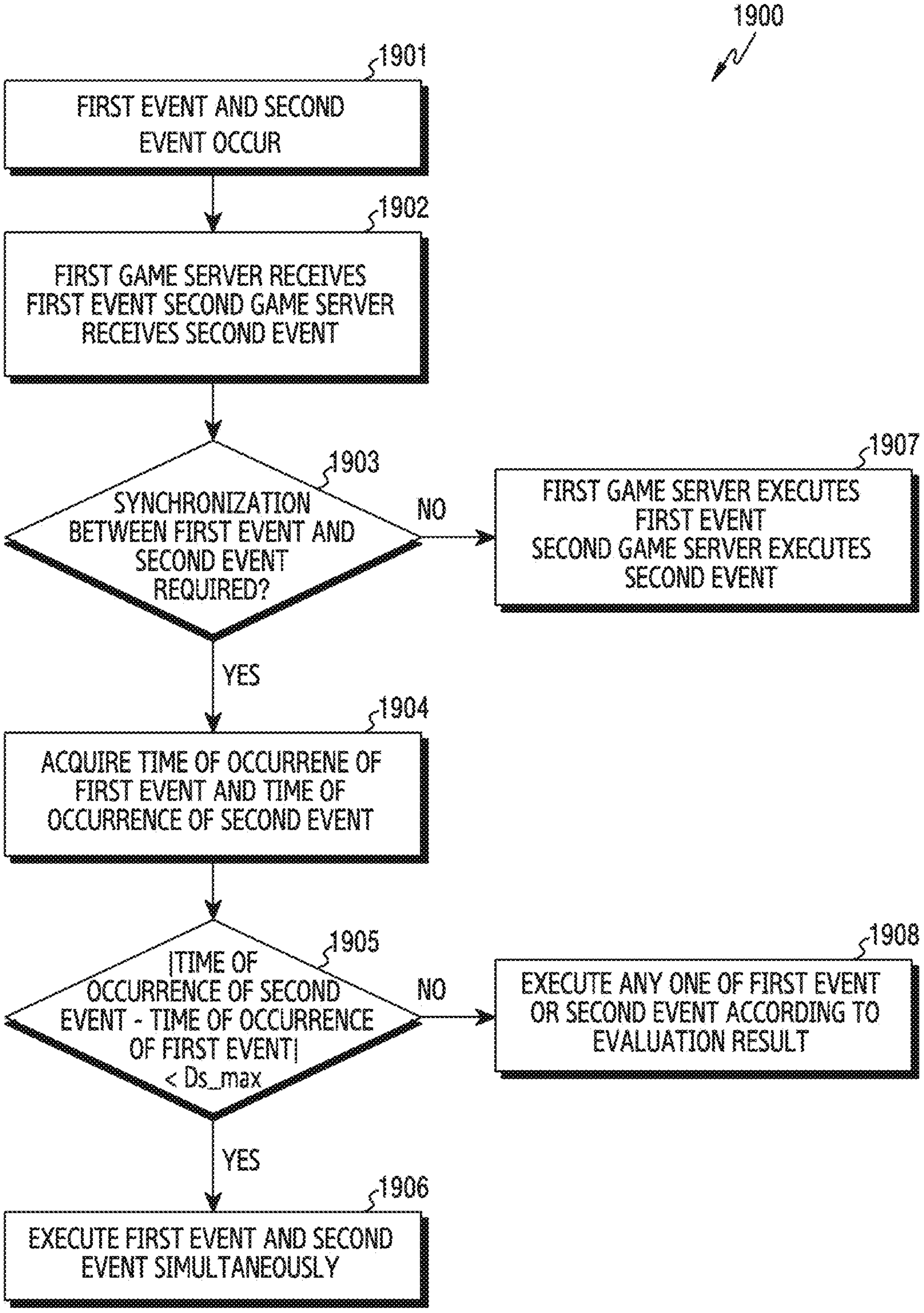
FIG. 19 is a flowchart illustrating an example method of operating an electronic device according to various embodiments.
Figure 20:
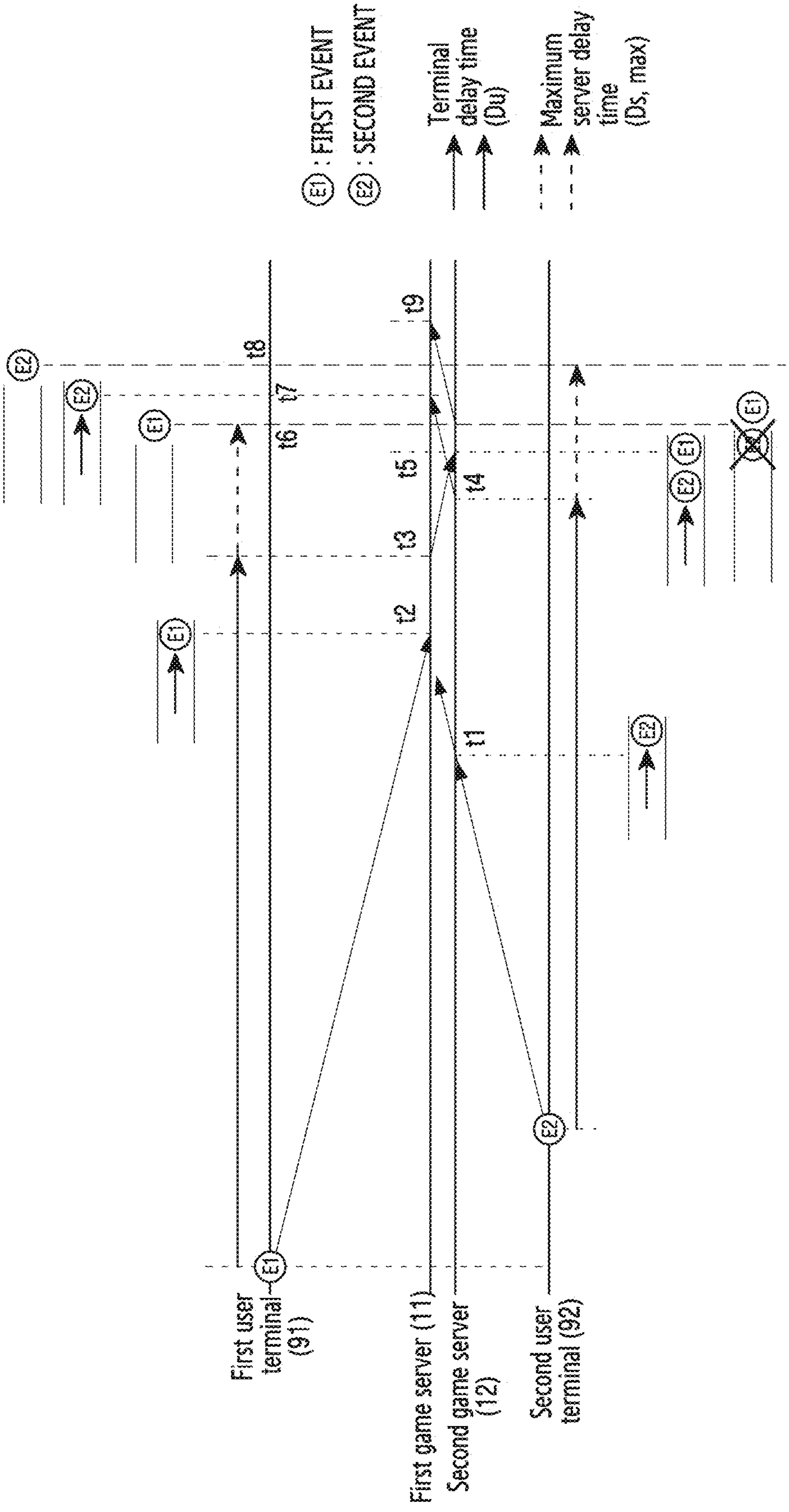
FIG. 20 is a reference diagram for the flowchart of FIG. 19.

FIG. 19 is a flowchart illustrating an example method of operating an electronic device according to various embodiments, and FIG. 20 is a reference diagram for the flowchart of FIG. 19.

Meanwhile, the electronic device 1 of an embodiment does not cancel even in a situation of having to be canceled due to a preceding first event (E1), after the second event (E2) is propagated to the first game server 11.

FIG. 20 illustrates a situation in which a time point of occurrence of the second event (E1) is a little ahead and thus a time point of Tg(E2)+Du (=t4) is ahead of a time point (t6) of execution of the first event (E1).

In this case, the second event (E2) is propagated to the first game server 11 before the second event (E2) is canceled by the execution of the first event (E1). When the first event (E1) is executed, the second game server 12 may determine that the second event (E2) should be canceled, and send a cancellation message so that even the first game server 11 cancels the second event (E2) at the same time of executing it.

However, at a time point (t9) when the cancellation message arrives at the first game server 11, since the second event (E2) has been executed at a time point (t8), the first game server 11 cannot reverse it. Even if the second event (E2) does not occur in the second game server 12, it may be executed as if the second event (E2) of the second game server 12 occurred in the first game server 11.

For example, the above description may be applied to a situation in which a character located in a second region dies the moment the character intends to throw a grenade near a boundary between a first region and the second region, and a grenade explosion effect appears in the first region although the grenade has not been actually thrown.

While an event order change by an excessive transmission delay cannot be recognized by a user, such inconsistency may be easily recognized by the user. That is, this is because damage occurs to a character located in the first region even though the grenade has not been thrown. In addition, at the same time point, nothing happens to characters within a damage range of the second region. This phenomenon may be recognized by the user as a program error.

In the present disclosure, in order to prevent the recognition of the above-described error, the result of the event is decided at a time point when the event is propagated to one or more adjacent servers.

The advantage obtainable through this is that an inconsistency situation easily recognizable by a user does not occur, and the disadvantage is that a case may occur in which despite a condition that one event has to affect another event according to circumstances, it is disregarded.

This is the same effect as two events occurring with a time difference are processed as if they occurred simultaneously. When this method is applied between two competing users, it is an unfair judgment. This is because even though one user inputs first, it is processed as being inputted simultaneously.

Since this unfair judgment is not easily recognized from a user's point of view, the present disclosure may adopt a method of maximally reducing a possibility of occurrence of this situation while accepting the aforementioned method.

A condition that a following second event is treated as occurring concurrently with a preceding first event is that, before the first event is executed, the second event is propagated to at least one or more adjacent game servers.

Since a time point of execution of the first event is Tg(E1)+D_max, and a time point of propagation of the second event is Tg(E2)+Du, a condition that the second event is propagated before the first event is executed is Tg(E2)+Du<Tg(E1)+Dmax, and in other words, Tg(E2)−Tg(E1)<D_max−Du=Ds_max.

That is, when a time of occurrence of the two events is less than the 'Ds_max', its difference of time may be disregarded and the two events may be treated as having occurred simultaneously.

Therefore, in order to reduce the disregarded time difference, the 'Ds_max' should be made small. On the other hand, at the time of synchronizing an event (E) with an adjacent game server, when an actual transmission delay time is greater than the 'Ds_max', a message reception time point in the adjacent game server becomes greater than 'Te(E)', so the event cannot be executed at a correct time in a receiving game server.

Accordingly, the order of events may be reversed for execution. To prevent or avoid this situation, the Ds_max must be set to be greater than an actually possible transmission delay.

When a transmission delay between game servers is reduced, a value of Ds_max may be also reduced accordingly. Thus, a time difference disregarded by event synchronization may be also reduced. To this end, the present disclosure includes a method of reducing a transmission delay between game servers.

Since the transmission delay between the two game servers is determined by a server load at a transmission time point and a network load between the two servers, the transmission delay may vary depending on transmitting and receiving servers.

Therefore, the 'Ds_max' may also be expressed as Ds_max(Ss, Sr, t). The 'Ds_max(Ss, Sr, t)' corresponds to the maximum transmission delay value expected for a message to be transmitted from a sending server (Ss) to a receiving server (Sr) at time (t).

The 'Ds_max' may be set experimentally in an environment in which the electronic device 1 is implemented. Since respective game servers are close to each other on a network, precise time synchronization is possible, and a one-way transmission delay may be measured based on a synchronized timer. The one-way transmission delay may be obtained by recording a transmission time to a message at the time of sending a message, and subtracting the transmission time recorded to the message from a message reception time at a receive end. On the premise that a transmit end and a receive end are time-synchronized with a sufficient precision, the message transmission delay may follow the following relational expression.

Message transmission delay=message reception time−message transmission time

While the transmission delay may be measured at the message receive end, since a place to use a Ds_max value is the message transmit end, the determined Ds_max value needs to be updated at the transmit end periodically or according to a predetermined condition.

Among game servers, a receiving server (Sr) is an adjacent server, and updates the Ds_max(Ss, Sr) value whenever receiving a message from a sending server (Ss), and notifies it to the receiving server (Sr) according to a set condition. The notification condition may be once at predetermined intervals, or may be notified whenever the Ds_max value increases or decreases beyond a reference value.

A method for estimating the 'Ds_max' may vary, and even in the same method, the result may vary depending on a used parameter, and which method and parameter used are optimal must be found in an actual service.

One example of a method that may be used to determine the 'Ds_max' may be a TCP RTO determination method (see, for example, "https://datatracker.ietf.org/doc/html/rfc6298", p. 2, the disclosure of which is incorporated by reference herein in its entirety). In an RTO determination formula, an RTT measurement value may be replaced with a one-way delay measurement value between servers, and the resulting value may be used as the Ds_max value.

Assume that Ts(Ss, Sr, E) is a time point at which the sending server (Ss) evaluates whether synchronization with the adjacent receiving server (Sr) is necessary for an event (E), Ts(Ss, Sr, E)=Tg(E)+Du(Ss, Sr)=Tg(E)+Dmax−Ds_max(Ss, Sr), and the sending server (Ss) evaluates an event (E) at this time point and when it is determined that its influence range includes a region of the receiving server (Sr), the sending server (Ss) must synchronize it with the receiving server (Sr). Thus, each adjacent server must evaluate the same event (E) separately at different time points and determine whether to synchronize.

Since this may increase a complexity and determination amount of the algorithm and lead to the result of increasing a processing delay of the game server, the present disclosure may commonly apply the largest value among the 'Ds_max' for each adjacent server to all adjacent servers, without applying a different Ds_max value for each receiving server (Sr).

When a commonly applied maximum transmission delay time between the servers is defined as Ds_max2, it is Ds_max2(Ss)=Max(Ds_max(Ss, Sr)) for all the adjacent servers (Sr) of the sending server (Ss), and whether synchronization between the servers is required for the event (E) in the sending server (Ss) may be evaluated only once at a time point of Ts(Ss, E)=Tg(E)+Dmax−Ds_max2(Ss). At this time point, the event synchronization is executed for all adjacent servers that the event (E) is determined to affect.

Referring to FIG. 19, when a first event and a second event occur in each of the first user terminal 11 and the second user terminal 12 (1901), the first game server 11 receives the first event, and the second game server 12 receives the second event (1902).

When synchronization is required between the first event and the second event (Yes in operation 1903) (when events affect each other), the electronic device 1 acquires a time of occurrence of the first event and a time of occurrence of the second event (1904), but when the synchronization is not required (No in operation 1903), the first game server 11 executes the first event, and the second game server 12 executes the second event (1907).

When a difference between the time of occurrence of the second event and the time of occurrence of the first event is less than Ds_max (1905), the electronic device 1 controls the first game server 11 and the second game server to execute the first event and the second event simultaneously (1906).

When the difference between the time of occurrence of the second event and the time of occurrence of the first event is not less than the Ds_max, the electronic device 1 executes any one of the first event or the second event according to the evaluation result (1908).

According to an embodiment, the electronic device 1 may update a second time according to a predetermined cycle. The second time may correspond to the maximum transmission delay time between the servers, and may be determined based on a load of each of the first game server 11 and the second game server 12 and a network load of the first game server 11 and the second game server 12.

According to an embodiment, when a difference between a time point of provision of a first command and a time point of provision of a second command is less than the second time, the electronic device 1 may control the first game server and the second game server to execute the first event and the second event simultaneously.

Various embodiments of the present disclosure and terms used therein are not intended to limit the technical features described in the present disclosure to detailed embodiments, and should be understood as including various modifications, equivalents, or alternatives of the embodiments. In relation with the description of the drawings, like reference numerals may be used for like or related components. The singular form of a noun corresponding to an item may include one item or a plurality of items, unless the relevant context clearly dictates otherwise. In the present disclosure, each of phrases such as "A or B", "at least one of A and B", "at least one of A or B", "A, B or C", "at least one of A, B and C", and "at least one of A, B, or C" may include any one of the items listed together in the corresponding phrase among the phrases, or all possible combinations thereof. Terms such as "first", "second", or "firstly" or "secondary" may simply be used to distinguish the corresponding component from other corresponding components, and do not limit the corresponding components in other respects (e.g., importance or order). When it is mentioned that any (e.g., first) component is "coupled" or "connected" to another (e.g., second) component, with or without the terms "functionally" or "communicatively", any component may be connected to another component directly (e.g., by wire), wirelessly, or through a third component.

The term "module" used in various embodiments of the present disclosure may include a unit implemented in hardware, software, or firmware, and may be used interchangeably with terms such as, for example, logic, logic blocks, components, or circuits. The module may be an integrally constructed component, or the minimum unit of the components, or a part thereof, that performs one or more functions. For example, according to an embodiment, the module may be implemented in the form of an application-specific integrated circuit (ASIC).

Various embodiments of the present disclosure may be implemented by software (e.g., program) including one or more instructions stored in a storage medium (e.g., internal memory or external memory) readable by a machine (e.g., the electronic device 1). For example, a processor (e.g., the processor 50) of the machine (e.g., the electronic device 1) may call at least one of the stored one or more instructions from the storage medium, and execute it. This enables the machine to be operated to perform at least one function according to the at least one instruction invoked. The one or more instructions may include a code provided by a compiler or a code executable by an interpreter. The machine-readable storage medium may be presented in the form of a non-transitory storage medium. Here, the 'non-transitory' storage medium is a tangible device and may not include a signal (e.g., electromagnetic wave), and this term does not distinguish where data is stored semi-permanently in the storage medium and where when data is temporarily stored.

According to an embodiment, a method of various embodiments disclosed in the present disclosure may be included and presented in a computer program product. The computer program product may be traded between sellers and buyers as commodities. The computer program product is distributed in the form of a machine-readable storage medium (e.g., compact disc read only memory (CD-ROM)), or may be distributed (e.g., downloaded or uploaded) through an application store (e.g., Play Store™) or online, directly between two user devices (e.g., smart phones). In online distribution, at least part of the computer program product may be stored in at least a transitory manner, or be created temporarily, in a machine-readable storage medium such as a manufacturer's server, an application store's server, or a relay server's memory.

According to various embodiments, each component (e.g., module or program) of the components described above may include a single or plurality of entities, and some of the plurality of entities may be also separately disposed in other components. According to various embodiments, one or more components or operations among the aforementioned components may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component of the plurality of components prior to the integration. According to various embodiments, operations performed by modules, programs, or other components are executed sequentially, in parallel, iteratively, or heuristically, or one or more of the operations are executed in different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a processor; and memory storing instructions that, when executed by the processor, cause the electronic device to:

control a plurality of game servers including a first game server and a second game server, the first game server configured to execute events occurring in a first region of a virtual space, and the second game server configured to execute events occurring in a second region, adjacent to the first region of the virtual space, control the first game server to function as a scaling server by transferring at least one cell of a plurality of cells of the second region from the second game server to the first game server, based on load condition of the first game server and the second game server, wherein the plurality of cells include a set of cells which are a minimum division units of an entire map for which the scaling server and the at least one game server are responsible together, and divide the entire map into a plurality of regions, and the plurality of regions comprise the first region and the at least one second region adjacent to the first region, control to transfer the at least one cell of the second region, previously transferred to the first game server functioning as the scaling server, to a variable server based on load condition of the scaling server, and calculate a load provided in each of the plurality of regions, the load comprising an internal load for processing an event occurring in one region and a synchronization load for synchronizing the event occurring in one region with a region different from the one region.

2. The electronic device of claim 1, wherein the instructions, when executed by the processor, cause the electronic device to create the variable server in case of that a load size of the scaling server exceeds a threshold, and control the scaling server to transfer at least one cell allocated to the scaling server to the variable server in order to process at least one event processed by the scaling server instead.

3. The electronic device of claim 1, further comprising a region allocation server configured to manage coordinate information of a plurality of cells included in each of the plurality of regions, wherein the instructions, when executed by the processor, cause the electronic device to update coordinate information of the region allocation server corresponding to the plurality of regions based on at least one cell being transferred between the plurality of regions.

4. The electronic device of claim 1, wherein the instructions, when executed by the processor, cause the electronic device to determine whether the size of the load belongs to a section among:

a first section having a load range less than an appropriate load range, a second section having to the appropriate load range, or a third section having a load range greater than the appropriate load range.

5. The electronic device of claim 4, wherein the at least one second region comprises a first second region and a second second region adjacent to the first second region, and wherein the instructions, when executed by the processor, cause the electronic device to:

acquire the size of a load provided in the first second region and the size of a load provided in the second second region at specified intervals, and control the at least one game server so that at least one cell adjacent to a boundary between the first second region and the second second region is transferred between the first second region and the second second region, based on all the size of the load provided in the first second region and the size of the load provided in the second second region belonging to the second section.

6. The electronic device of claim 5, wherein the plurality of regions comprise at least one third region adjacent to the at least one second region, and the at least one game server is configured to execute a third event occurring in the at least one third region.

7. The electronic device of claim 6, wherein the instructions, when executed by the processor, cause the electronic device to:

acquire the size of a load provided in the second region and the size of a load provided in the third region at specified intervals, and control the at least one game server so that at least one cell adjacent to a boundary between the second region and the third region is transferred between the second region and the third region, based on all the size of the load provided in the second region and the size of the load provided in the third region belonging to the second section.

8. The electronic device of claim 7, wherein the instructions, when executed by the processor, cause the electronic device to control the at least one game server so that at least one cell located in the third region is transferred to the second region, based on the size of the load provided in the third region belonging to the third section, and the size of the load provided in the second region adjacent to the third region belonging to the first section.

9. The electronic device of claim 7, wherein the instructions, when executed by the processor, cause the electronic device to control the at least one game server so that at least one cell located in the second region is transferred to the first region, based on the size of the load provided in the second region belonging to the third section, and the size of the load provided in the first region adjacent to the second region belonging to the first section.

10. The electronic device of claim 7, wherein the instructions, when executed by the processor, cause the electronic device to control the at least one game server so that at least one cell located in the first second region is transferred to the second second region, based on the size of the load provided in the first second region belonging to the third section and the size of the load provided in the second second region belonging to the first section.

11. The electronic device of claim 7, wherein the instructions, when executed by the processor, cause the electronic device to: create the variable server, and control the scaling server so that at least one cell located in the first region is transferred to the variable server, based on the size of the load provided in the first region belonging to the third section.

12. The electronic device of claim 1, further comprising a communication module comprising communication circuitry configured to communicate with a user terminal granted a character through a network, wherein the user terminal is configured to receive a command for an event occurring in the scaling server or the at least one game server, and wherein the instructions, when executed by the processor, cause the electronic device to control the communication module to notify the user terminal of the server change based on a server to which the character belongs being changed according as the at least one cell is transferred in a state in which the character belongs to the at least one cell.

* * * * *